US 8,683,582 B2

(12) United States Patent
Rogers

(10) Patent No.: US 8,683,582 B2
(45) Date of Patent: Mar. 25, 2014

(54) METHOD AND SYSTEM FOR GRAPHICAL PASSCODE SECURITY

(75) Inventor: Sean Scott Rogers, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1082 days.

(21) Appl. No.: 12/139,692

(22) Filed: Jun. 16, 2008

(65) Prior Publication Data

US 2009/0313693 A1 Dec. 17, 2009

(51) Int. Cl.
G06F 7/04 (2006.01)
G06F 12/00 (2006.01)
G06F 12/14 (2006.01)
G06F 13/00 (2006.01)

(52) U.S. Cl.
USPC .......................................................... 726/21

(58) Field of Classification Search
CPC ...................................................... G06F 21/36
USPC .......................................................... 726/21
See application file for complete search history.

(56) References Cited

U.S. PATENT DOCUMENTS

| | | | |
|---|---|---|---|
| 5,347,589 A | 9/1994 | Meeks et al. | |
| 5,687,254 A | 11/1997 | Poon et al. | |
| 5,917,942 A | 6/1999 | Ehsani et al. | |
| 6,275,611 B1 | 8/2001 | Parthasarathy | |
| 7,054,510 B1 | 5/2006 | Milner | |
| 7,243,239 B2 * | 7/2007 | Kirovski et al. | 713/184 |
| 7,298,904 B2 | 11/2007 | Chen et al. | |
| 2001/0044906 A1 | 11/2001 | Kanevsky et al. | |
| 2004/0095384 A1 | 5/2004 | Avni et al. | |
| 2006/0174339 A1 * | 8/2006 | Tao | 726/18 |
| 2008/0136587 A1 * | 6/2008 | Orr | 340/5.31 |
| 2008/0235788 A1 * | 9/2008 | El Saddik et al. | 726/18 |
| 2009/0313693 A1 * | 12/2009 | Rogers | 726/21 |
| 2010/0225443 A1 * | 9/2010 | Bayram et al. | 340/5.83 |

FOREIGN PATENT DOCUMENTS

| | | |
|---|---|---|
| CN | 101079707 A | 11/2007 |
| EP | 1879127 A1 | 1/2008 |
| JP | 62172478 A | 7/1987 |
| JP | 1097628 A | 4/1989 |

(Continued)

OTHER PUBLICATIONS

Bandyopadhyay, Samir Kumar, Debnath Bhattacharyya, and Poulami Das. "User Authentication by Secured Graphical Password Implementation." Information and Telecommunication Technologies, 2008. APSITT. 7th Asia-Pacific Symposium on. IEEE, 2008.*

(Continued)

*Primary Examiner* — Christopher Brown
*Assistant Examiner* — Harris Wang
(74) *Attorney, Agent, or Firm* — James T. Hagler

(57) ABSTRACT

A method and system for electronic access security uses touches and movements on a touch sensitive surface to determine graphical passcode that are used in a manner similar to passwords. Graphical passcodes comprise various combinations of swipes, taps or drags on a touchscreen surface as defined by a user. A user's selected graphical passcode is stored in memory for comparison to subsequent entries of graphical passcode in order to authenticate the users. An envelope may be generated to define a range of acceptable pressure, speed, coordinate positions or other parameters, as a function of time or position, required for passcode authentication. The envelope may be stored in a computer memory and is used to authenticate a user by determine whether an entered graphical passcode falls within the envelope.

63 Claims, 21 Drawing Sheets

(56) References Cited

FOREIGN PATENT DOCUMENTS

| | | | |
|---|---|---|---|
| JP | 4282776 | A | 10/1992 |
| JP | 8137800 | A | 5/1996 |
| JP | 9027031 | A | 1/1997 |
| JP | 2002082734 | A | 3/2002 |
| JP | 2004178394 | A | 6/2004 |
| KR | 20020003321 | A | 1/2002 |

OTHER PUBLICATIONS

International Search Report and Written Opinion—PCT/US2009/046676, International Search Authority—European Patent Office—Dec. 11, 2009.

* cited by examiner

| X-Axis Position | Pressure (PSI) |
|---|---|
| 1 | 0 |
| 2 | 0 |
| 3 | 20 +/-2 PSI |
| 4 | 0 |
| 5 | 0 |
| 6 | 10 +/-2 PSI |
| 7 | 10 +/- 2 PSI |
| 8 | 10 +/- 2 PSI |
| 9 | 11 +/- 2 PSI |
| 10 | 14 +/- 2 PSI |
| 11 | 25 +/- 2 PSI |
| 12 | 14 +/- 2 PSI |
| 13 | 11 +/- 2 PSI |
| 14 | 10 +/- 2 PSI |
| 15 | 10 +/-2 PSI |
| 16 | 10 +/- 2 PSI |
| 17 | 0 |
| 18 | 20 +/-2 PSI |
| 19 | 0 |
| 20 | 20 +/- 2 PSI |

| y-Axis Position | Pressure (PSI) |
|---|---|
| 1 | 0 |
| 2 | 0 |
| 3 | 20 +/-2 PSI |
| 4 | 0 |
| 5 | 20 +/- 2 PSI |
| 6 | 0 |
| 7 | 10 +/- 2 PSI |
| 8 | 10 +/- 2 PSI |
| 9 | 11 +/- 2 PSI |
| 10 | 14 +/- 2 PSI |
| 11 | 25 +/- 2 PSI |
| 12 | 14 +/- 2 PSI |
| 13 | 11 +/- 2 PSI |
| 14 | 10 +/- 2 PSI |
| 15 | 10 +/-2 PSI |
| 16 | 0 |
| 17 | 20 +/- 2 PSI |
| 18 | 0 |
| 19 | 0 |
| 20 | 0 |

Fig. 9

| Time (ms) | Pressure (PSI) |
|---|---|
| 1 | 0 |
| 2 | 0 |
| 3 | 20 +/-2 PSI |
| 4 | 0 |
| 5 | 0 |
| 6 | 10 +/-2 PSI |
| 7 | 10 +/- 2 PSI |
| 8 | 10 +/- 2 PSI |
| 9 | 11 +/- 2 PSI |
| 10 | 14 +/- 2 PSI |
| 11 | 25 +/- 2 PSI |
| 12 | 14 +/- 2 PSI |
| 13 | 11 +/- 2 PSI |
| 14 | 10 +/- 2 PSI |
| 15 | 10 +/-2 PSI |
| 16 | 10 +/- 2 PSI |
| 17 | 0 |
| 18 | 20 +/-2 PSI |
| 19 | 0 |
| 20 | 20 +/- 2 PSI |

| Time (ms) | Speed (mm/s) |
|---|---|
| 1 | 0 |
| 2 | 0 |
| 3 | 0 +/- 2 mm/s |
| 4 | 0 |
| 5 | 0 |
| 6 | 20 +/- 2 mm/s |
| 7 | 19 +/- 2 mm/s |
| 8 | 18 +/- s mm/s |
| 9 | 17 +/- 2 mm/s |
| 10 | 16 +/- 2 mm/s |
| 11 | 15 +/- 2 mm/s |
| 12 | 14 +/- 2 mm/s |
| 13 | 13 +/- 2 mm/s |
| 14 | 12 +/- 2 mm/s |
| 15 | 11 +/- 2nm/s |
| 16 | 10 +/- 2 mm/s |
| 17 | 0 |
| 18 | 0 +/- 2 mm/s |
| 19 | 0 |
| 20 | 0 +/- 2 mm/s |

Fig. 10

| Time (ms) | X-Axis Position | y-Axis Position | Pressure (PSI) | Speed (nm/s) |
|---|---|---|---|---|
| 1 | | | 0 | 0 |
| 2 | | | 0 | 0 |
| 3 | 3 | 17 | 20 PSI | 0 mm/s |
| 4 | | | 0 | 0 |
| 5 | | | 0 | 0 |
| 6 | 6 | 15 | 10 PSI | 20 mm/s |
| 7 | 7 | 15 | 10.5 PSI | 19 mm/s |
| 8 | 8 | 14 | 10.9 PSI | 18 mm/s |
| 9 | 9 | 13 | 11 PSI | 17 mm/s |
| 10 | 10 | 12 | 14 PSI | 16 mm/s |
| 11 | 11 | 11 | 25 PSI | 15 mm/s |
| 12 | 12 | 10 | 14 PSI | 14 mm/s |
| 13 | 13 | 9 | 11 PSI | 13 mm/s |
| 14 | 14 | 8 | 10 PSI | 12 mm/s |
| 15 | 15 | 7 | 10 PSI | 11 mm/s |
| 16 | 16 | 7 | 10 PSI | 10 mm/s |
| 17 | | | 0 | 0 |
| 18 | 18 | 5 | 20 PSI | 0 mm/s |
| 19 | | | 0 | 0 |
| 20 | 20 | 3 | 20 PSI | 0 nm/s |

METHOD AND SYSTEM FOR GRAPHICAL PASSCODE SECURITY

FIELD OF THE INVENTION

The present invention relates generally to computer security and more particularly to methods and systems for using touchscreen-input graphical passcodes for secure computer access.

BACKGROUND

Personal electronic devices (e.g. cell phones, PDAs, laptops, gaming devices) provide users with increasing functionality and data storage. Typically, users store sensitive data such as personal financial information, contact information and written communications on personal electronic devices. Hence, restricting access to personal electronic devices is a necessity for many users.

Computer security typically relies on passwords and optional personal identifiers. Such passwords and identifiers are typically entered via a keypad to gain access to a computer. A problem with alphanumeric, keypad-entry passwords is that they are easily forgotten or confused between different devices. Forgetting a password essentially renders a device unusable. Also, simple and easily remembered passwords may often be deduced. Hence, there is a need for secure access methods that facilitate easily remembered and intuitive passcodes and personal identifiers. Such a method and system could be widely used to provide intuitive and secure access to personal electronic devices.

SUMMARY

Various embodiments provide methods and systems for reliably and rapidly identifying graphical passcodes and/or identifiers entered on a touchscreen or touchpad of an electronic device. Embodiment methods and systems monitor timing data, pressure magnitude data, speed data, and/or coordinate (position) data in identifying graphical passcodes. Alternative embodiment methods and systems can properly identify graphical passcodes even when random variations in timing, pressure, speed and/or coordinate (position) data occur in an entered passcode.

In an embodiment method secure access to a mobile device is provided by using graphical passcodes. First, a user may create a graphical passcode by touching the touchpad in a memorable manner one or more times and storing the resulting information in a non-volatile computer readable memory of the electronic device that is to be secured. Then an envelope is defined for a measurable parameter (e.g. pressure, speed) of the stored graphical passcode. The envelope is also stored in the non-volatile computer readable memory. When a user requests access to the secured electronic device, the user is prompted to enter the graphical passcode. The user then inputs the graphical passcode by touching the touchscreen or touchpad in the same memorable manner. The measurable parameter of the input graphical passcode is measured, and compared with the envelope of the parameter stored in memory. Access is provided if the measured parameter falls within the envelope.

The various embodiment methods and systems may be implemented on various computer or electronic devices, including cellular phones, laptop computers, personal digital assistants (PDAs), smart phones, desktop computers, gaming consoles and the like. Also, the various embodiment methods and systems may be implemented with a variety of touchscreen or touchpad technologies, including resistive touch screens, capacitive touch screens, acoustic touch screens, and infrared touch screens. Also, the various embodiment methods and systems may utilize both touchscreens (which have an associated image display) and touchpads (which do not have an associated image display).

BRIEF DESCRIPTION OF THE DRAWINGS

The accompanying drawings, which are incorporated herein and constitute part of this specification, illustrate exemplary embodiments of the invention. Together with the general description given above and the detailed description given below, the drawings serve to explain features of the invention.

FIG. 9 illustrates exemplary data tables storing pressure vs. position envelopes for the graphical passcode of FIG. 2A.

FIG. 10 illustrates exemplary data tables storing pressure vs. time and speed vs. time envelopes for the graphical passcode of FIG. 2A.

FIG. 11 illustrates exemplary correlated dataset data table for storing measured passcode parameter for the graphical passcode of FIG. 2A.

DETAILED DESCRIPTION

Figure 1:
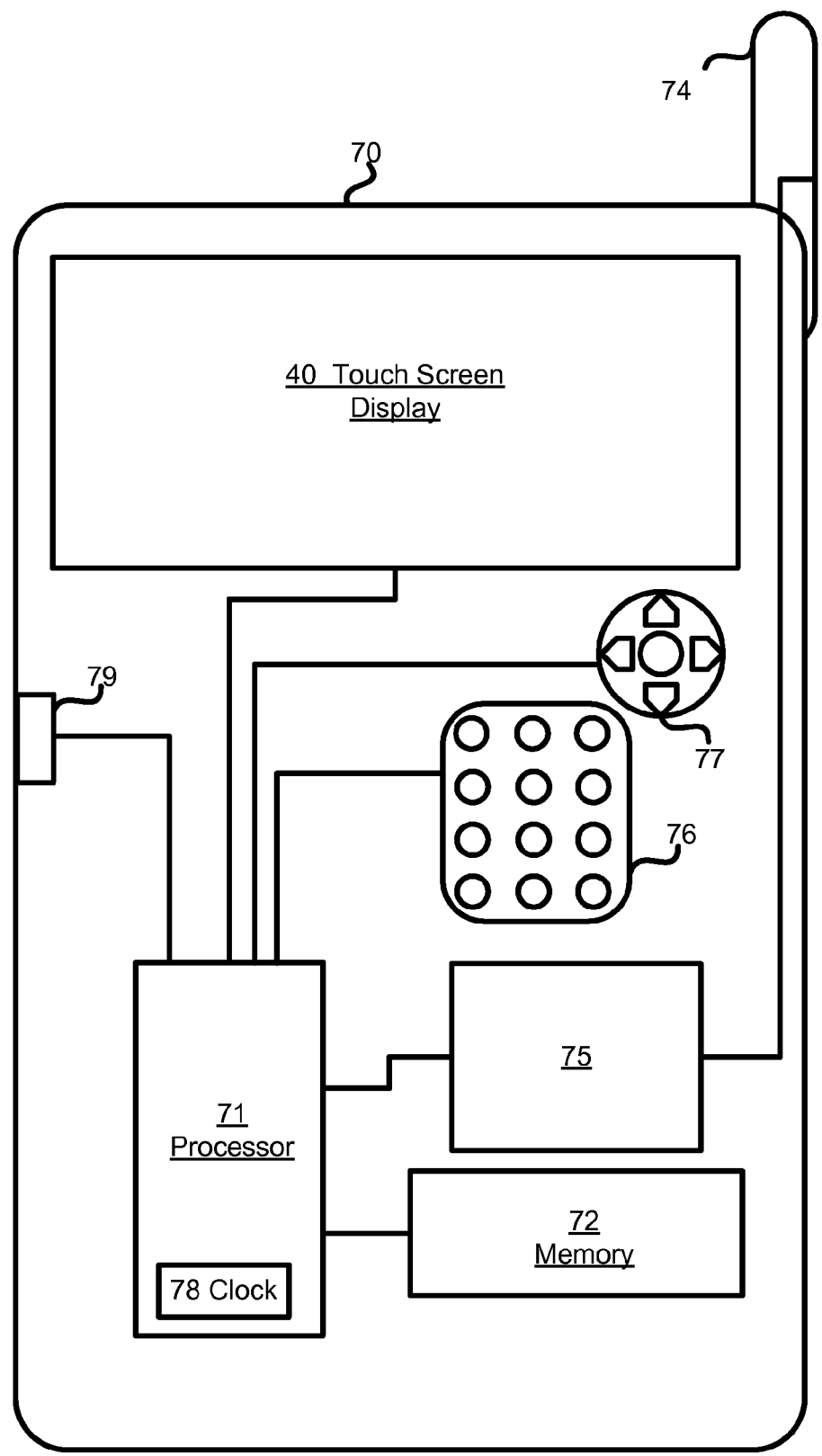
FIG. 1 is a component block diagram of an exemplary communication device capable of using the present method and system for graphical passcodes.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

As used herein, a "touchscreen" is a touch input device with an associated image display. As used herein, a "touchpad" is a touch input device without an associated image display. A touchpad, for example, can be implemented on any surface of an electronic device outside the image display area. Touchscreens and touchpads are generically referred to herein as "touchsurfaces". Touchsurface may be integral parts of an electronic device, such as a touch screen display, or a separate module which can be coupled to the electronic device by a wired or wireless data link.

As used herein, the terms "electronic device" or "portable device" refer to any one or all of cellular telephones, personal data assistants (PDA's), palm-top computers, wireless electronic mail receivers and cellular telephone receivers (e.g., the Blackberry® and Treo® devices), multimedia Internet enabled cellular telephones (e.g., the iPhone®), and similar personal electronic devices which include a programmable processor, memory and a connected or integral touchsurface. The present invention is applicable to any type of portable or non-portable electronic device having either an integral touchsurface or a touchsurface that is connectable to the electronic device, such as by a wired datalink (e.g., a USB or FireWire® data cable) or a wireless data link (e.g., a Blue-Tooth® data link). In a preferred embodiment, the electronic device is a cellular telephone.

As used herein, an "asset" refers to any of an electronic device, remote computer, server, website, network, database or other electronic equipment or informational asset.

As used herein, a "graphical passcode" is a figure, drawings, letter, or shape input on a touchsurface such as by a user's finger or a stylus. The graphical passcode is essentially a series of touches, swipes and/or taps on a touchsurface of varying pressure, speed and position. The graphical passcode is used as a password, personal identifier, or key to provide secure access to an electronic device, network, website or the like.

As used herein, "pressure" is intended to describe force per unit area, as well as a total applied force.

As used herein, "authentication" describes the process of determining if an inputted graphical passcode matches a stored or known graphical passcode. Typically, authentication is performed by comparing features of an entered graphical passcode with corresponding features of a graphical passcode stored in memory.

As used herein, "envelope" refers to a range of a parameter within a graphical passcode that accounts for the inherent variability in such passcodes. The parameter can be, for example, pressure, force, speed, X-axis position, Y-axis position, or line thickness (i.e. contact area). The parameter may be enveloped against time or against position on the touchsurface that is used for graphical passcode authentication. For authentication, a graphical passcode must occupy a portion of an envelope.

The various embodiments provide methods and systems for authenticating a user to an electronic device using a graphical passcode input via a touchsurface as an authentication credential. In operation a user creates a graphical passcode by touching a touchsurface in a series of movements and touches within a brief period of time. The series of movements and touches are recorded on the touchsurface in an initialization procedure. Users may be required to repeat the graphical passcode movements and touches a number of times to record variability in the movements, pressures and relative timing. Such variability can be used to define the boundaries or envelope of the graphical passcode. The graphical passcode created during the initialization procedure may be considered the template graphical passcode to which all subsequently inputted graphical passcodes are compared. The movements comprising both the template graphical passcode and subsequently inputted graphical passcodes may vary in terms of pressure, speed, position and/or line thickness. The graphical passcode created during the initialization procedure, including the variations in pressure, speed, position and/or line thickness, are stored in a non-volatile memory. With the template graphical passcode stored, subsequently inputted graphical passcode may be authenticated against the template graphical passcode before access to the electronic device is granted.

In various embodiments, when the template graphical passcode is inputted, one or more measurable parameters (e.g. timing, speed, pressure, force, line thickness, contact area, or location) of the inputted template graphical passcode is measured by the touchsurface. The measured parameters may be plotted as a function of time and/or position on the touchsurface. Alternatively, the measured parameters may be formatted as datasets in which each measured parameter is correlated to relative time values (e.g., time since the initiation of the passcode) and/or positional coordinates, such as X-Y coordinates on the touchscreen. These measured parameters and plots or correlated datasets may be stored as part of the template graphical passcode file. When a graphical passcode is subsequently inputted, the same parameters are measured and plotted as a function of time and/or position and compared to the plots of the template graphical passcode. Alternatively, subsequent graphical passcodes may be converted into datasets that are compared to stored datasets. In order for the subsequently inputted graphical passcode to be authenticated, the value of the measured parameter must fall within a range or tolerance for each time increment and/or position. In other words, the parameter plots must match those for the template graphical passcode within an envelope or tolerance.

In an embodiment, a range of parameter values for each time increment or positional increment may be determined during the initialization process so that subsequently inputted graphical passcodes do not have to match the template graphical passcode exactly. Rather, so long as the subsequently inputted graphical passcodes are inputted within some range similar to the template, the subsequently inputted graphical passcode will be authenticated. The range of parameter values may vary in time or position, and may be undefined (or infinitely large) in some regions of time or position. Hence, an envelope is defined of acceptable ranges for the parameters in time and position, and the measured parameter of a subsequently inputted graphical passcode should be within the envelope in order to be authenticated. The width and shape of the envelope may be calculated through training sessions with the user during the initialization process. Large variations in a measured parameter during the training session will produce a wide envelope; small variations in a measured parameter during the training session will produce a narrow envelope. The variability inherent in multiple entries of the graphical passcode may be determined using known statistical analysis methods such that the defined envelop encompasses most graphical passcodes entered by the user during the training session. For example, the envelope may be set at the two-sigma (i.e., two standard deviations) boundary from the average parameter measurements, which would encompass the user's graphical passcode approximately 95 percent of the time (at least under conditions similar to those during the training session). Optionally, users may input adjustments to be made to configure the looseness of the envelope so as to make the passcode more or less stringent. For example, users may input an adjustment that modifies the multiple applied to standard deviation (e.g., to set the envelop at 1.6 times the standard deviation values, for example).

FIG. 1 depicts typical components of a electronic device 70 capable of supporting the various embodiments. The electronic device 70 has a processor 71, a computer readable memory 72, a radio communications transceiver 75, a keypad 76, a navigation pad 77, an antenna 74, a clock 78 and a touch screen display 40. The touch screen display 40 can be any type of touch screen, such as a resistive-sensing touchscreen, capacitive-sensing touchscreen, infrared sensing touchscreen, acoustic/piezoelectric sensing touchscreen or the like. The various embodiments are not limited to any particular type of touchscreen or touchpad technology. During an initialization procedure, the user can execute a graphical passcode to be used as a template graphical passcode on the touch screen display 40. The template graphical passcode and associated plots or datasets are stored in the non-volatile computer readable memory 72. Subsequently, each time a user wishes to access the electronic device 70, the users provides the graphical passcode to the electronic device 70 via the touchscreen 40. The processor 71 compares the subsequently inputted graphical passcode to the template graphical passcode and associated plots or datasets (i.e. one or more envelopes) stored in the memory 72 as described more fully below.

In some embodiments, a touchsurface can be provided in areas of the electronic device 70 outside of the touchscreen 40. For example, the keypad 76 can include a touchsurface with buried capacitive touch sensors. In other embodiments the keypad 76 may be eliminated so the touchscreen 40 provides the complete user interface. In yet further embodiments, the touchsurface may be an external touchpad that can be connected to the electronic device 70 by means of a cable to a cable connector 79 (e.g., a FireWire® or USB connector) a wireless transceiver (e.g., transceiver 75) coupled to the processor.

In some embodiments, the electronic device 70 may include sensors for detecting and measuring the pressure or force applied to the touchscreen 40. The pressure or force measurement is preferably time-resolved or position-resolved so that the pressure or force can be measured and plotted or correlated as a function of time or position. In some embodiments, a force sensor is provided for measuring a total force applied to the entire touchscreen. For example a single force sensor disposed under the touchscreen can be used to measure the total force applied to the touchscreen 40.

Figure 2A:
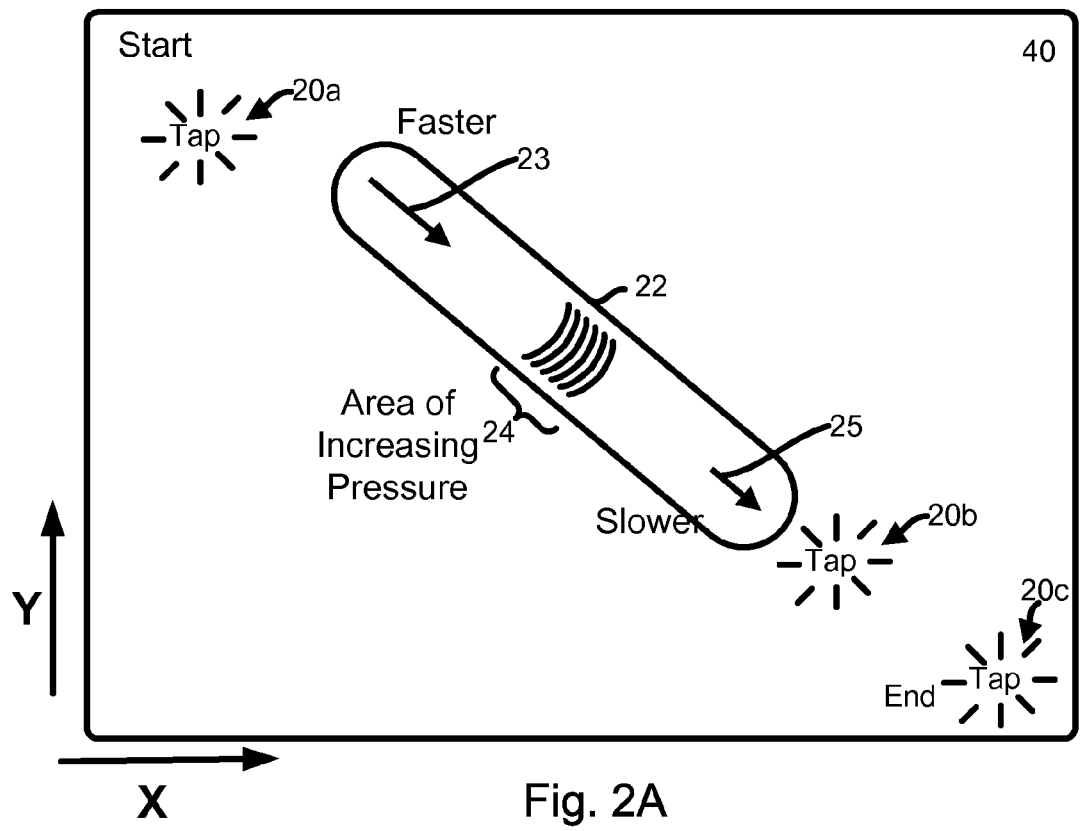
FIG. 2A illustrates an exemplary graphical passcode consisting of a tap, a swipe and two taps.

FIG. 2A illustrates an exemplary graphical passcode. In this example, the passcode includes of a first tap 20a in the upper left region of the touchscreen 40 followed by a swipe 22 in a downward, left to right direction, followed by two taps 20b and 20c in the lower right region of the touchscreen 40. The swipe 22 has a region of increased applied pressure/force 24 approximately in the middle of the swipe. Also, the swipe begins at a faster speed (near the tap 20a), and ends at a slower speed (near the tap 20b). The taps 20a. 20b. and 20c are approximately equal to each other in terms of measured pressure/force and speed values.

Figure 2B:
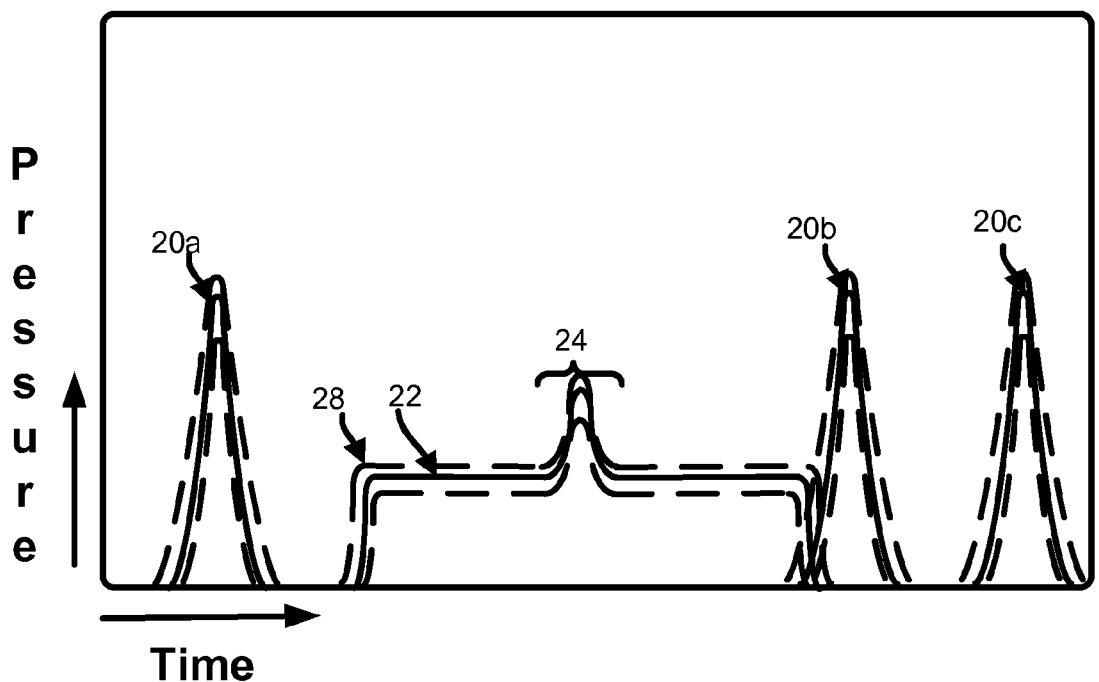
FIGS. 2B-2E are plots illustrating a variety of envelopes for different parameters of the graphical passcode shown in FIG. 2A.
Figure 2C:
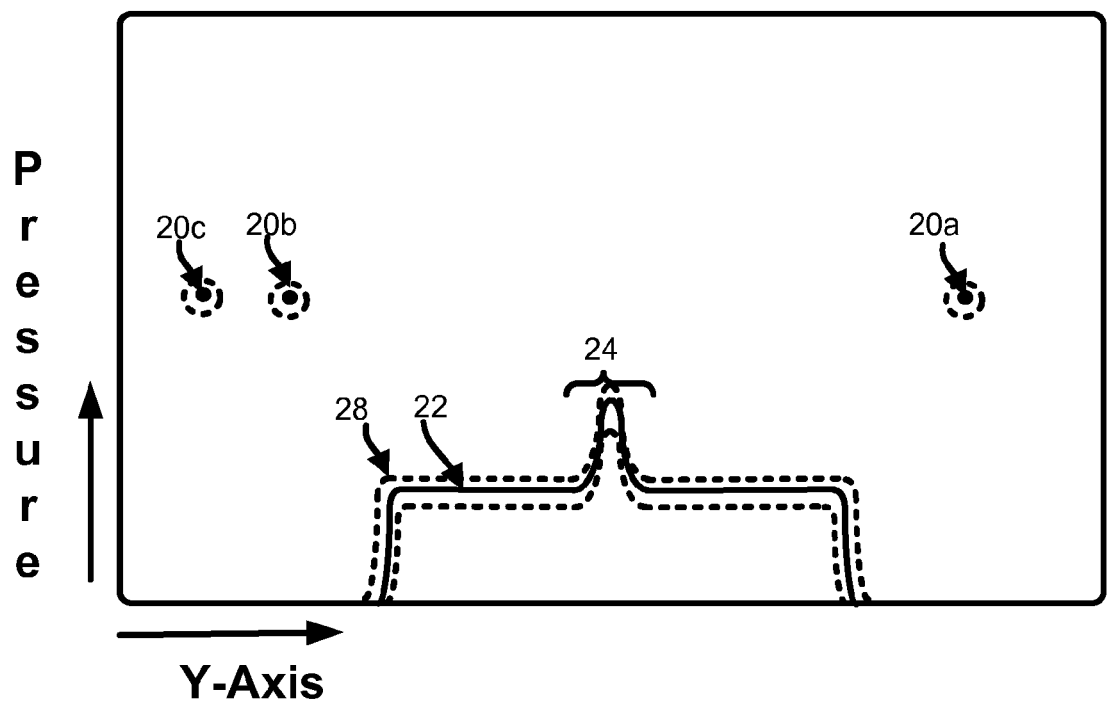

FIG. 2B is a plot of pressure (or force) versus time for the graphical passcode illustrated in FIG. 2A. Taps 20a 20b and 20c appear as spikes in pressure. The swipe 22 appears as a mesa shape, with a bulge in the middle corresponding to the region of increased force 24. Similarly, FIG. 2C is a plot of pressure (or force) versus Y-axis position for the passcode of FIG. 2A. In FIG. 2C, the taps 20a. 20b. and 20c appear as points of a particular pressure/force magnitude located along the Y-axis. Because the swipe 22 is linear in nature with an increased force area 24 in the middle of the swipe, FIG. 2C also shows the mesa shape, with a bulge in the middle corresponding to the region of increased force 24. In FIGS. 2B and 2C, solid lines and points illustrate actual measured values for pressure or force as a function of time or Y-axis position. The dashed lines 28 represent the parameter envelope which is discussed in more detail below.

Figure 2D:
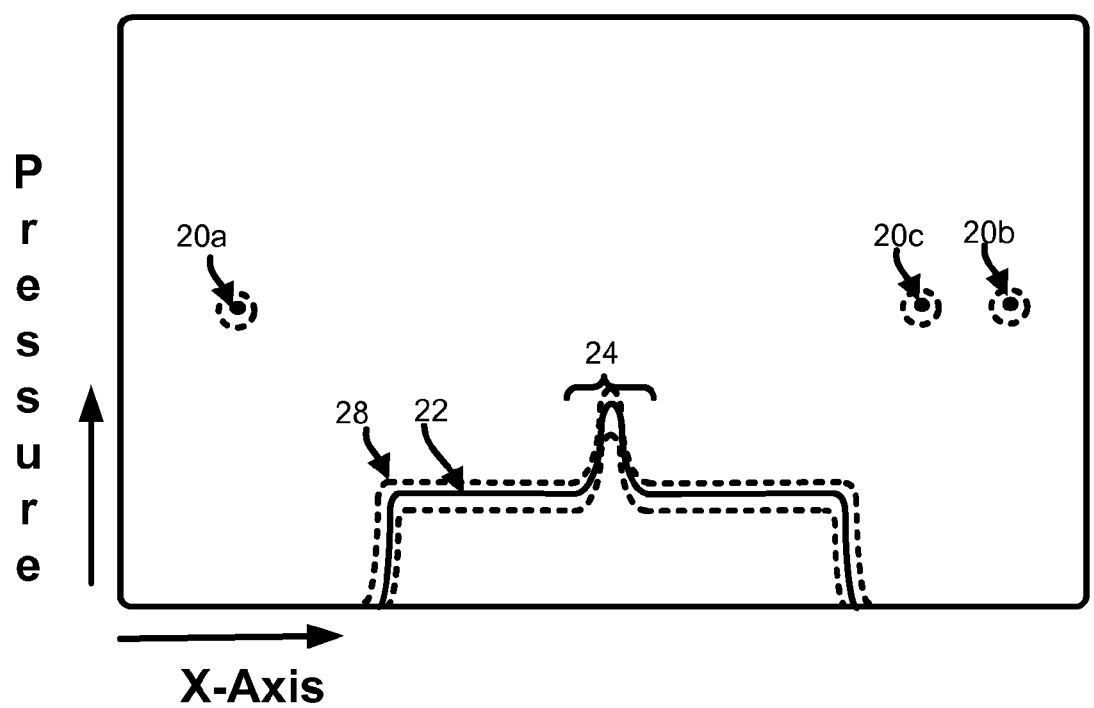
Figure 2E:
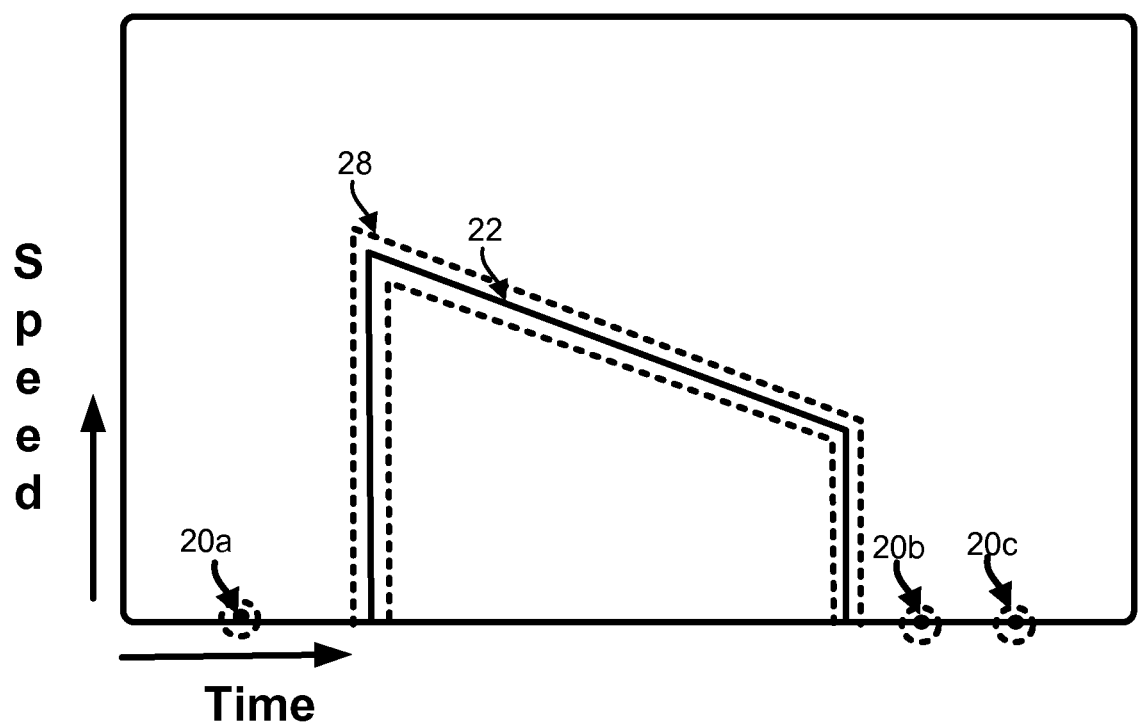

Similarly, FIG. 2D is a plot of pressure/force versus X-axis position for the passcode of FIG. 2A. As in FIG. 2C, in FIG. 2D, the taps 20a. 20b. and 20c appear as points of a particular pressure/force magnitude located along the X-axis. Due to the linear nature of swipe 22, the same mesa shape with bulge in the middle of the swipe is also shown in FIG. 2D. FIG. 2E is a plot of speed versus time for the passcode of FIG. 2A. As shown in FIG. 2E, the instantaneous taps are represented as points of essentially zero speed, while the swipe 22 is shown as a trapezoid shape where the speed of the swipe 22 starts off fast and ends slower.

The dashed lines illustrate parameter envelopes 28 about the graphical passcode illustrated in FIG. 2A. Parameter envelopes 28 represent the range of values for characteristic parameters (e.g. pressure, force, speed) within which an inputted graphical passcode must fall to be authenticated. In other words, the parameter envelope 28 circumscribes the parameter values that may be acceptable for an inputted graphical passcode to be considered authentic. A subsequently inputted graphical passcode that strays outside any of the plotted parameter envelope 28 may not be authenticated.

A graphical passcode can be authenticated by one or more characteristic parameters and associated envelopes. For example, the graphical passcode of FIG. 2A may be authenticated using only pressure vs. time data and the associated envelope in FIG. 2B. Alternatively, the graphical passcode can be authenticated using pressure vs. X-position and additionally pressure vs. Y-position and speed vs. time data, in which case the envelopes of FIGS. 2C, 2D and 2E are used. In a preferred embodiment a combination of parameters and parameter envelopes are used to authenticate an inputted graphical passcode.

A graphical passcode will generally be more secure if a larger number of characteristic parameters and envelopes are used for authentication. However, a large number of parameters and envelopes will also tend to make the graphical passcode harder to remember and use. A graphical passcode may become difficult to enter properly if speed, pressure, time, and location must all be accurately rendered. The appended claims are not in any way limited to any number of parameters, envelopes, or envelope values that must be used.

In an alternative embodiment, a user can adjust the size and shape of the parameter envelope. By widening the parameter envelope 28 surrounding the measured parameter value, less accuracy in inputting the graphical passcode is needed before the inputted graphical passcode is authenticated. Conversely, by narrowing the parameter envelope 28 surrounding the measured parameter value, more accuracy in inputting the graphical passcode is needed before the inputted graphical passcode is authenticated. This will allow the user to balance competing needs of security and ease of use. A large or wide envelope will be easier to satisfy and therefore less secure. A small or narrow envelope will be harder to satisfy and therefore more secure. The user can independently adjust the envelope sizes for pressure, timing, speed and other parameters. Alternatively, the size and width of the envelopes can be fixed, or adjusted by software in the device.

In another embodiment, a user can select which measured parameters are used for graphical passcode authentication.

For example, the user can decide if applied force, timing and/or speed are used as requirements for the graphical passcode. Also, the user can select if the parameter is measured as a function of position or as a function of time. Alternatively, the parameters used for authentication can be fixed by software or hardware in the device.

Figure 3A:
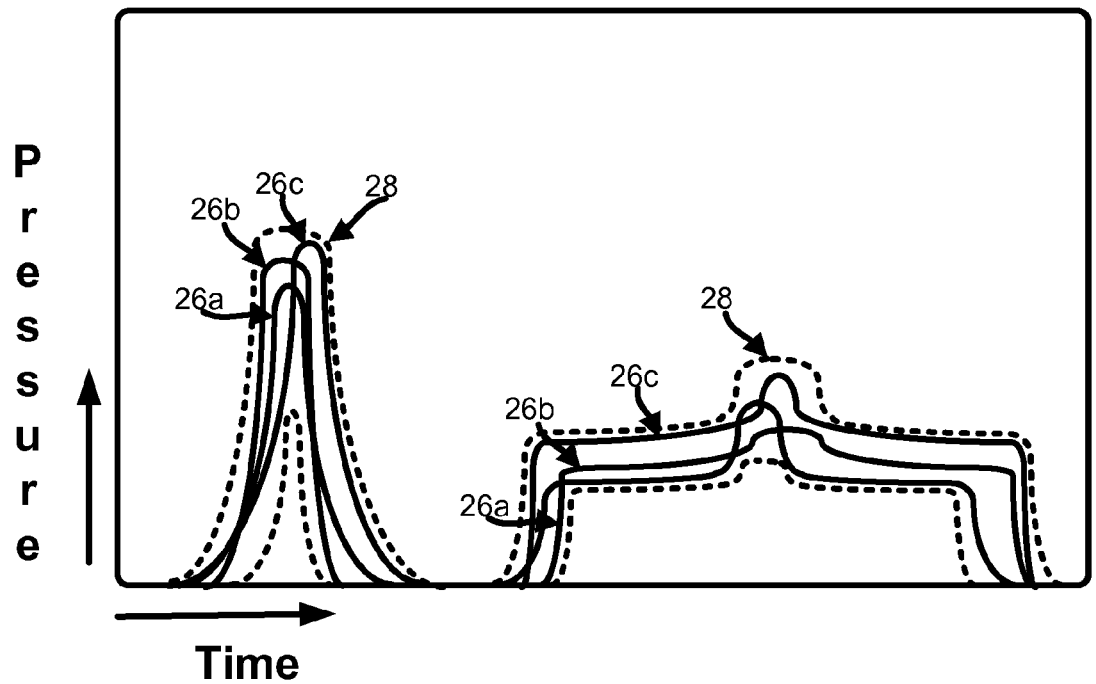
FIG. 3A is a plot illustrating an envelope designed to circumscribe three nominally identical graphical passcodes input during a training session.

In still other embodiments, the size and width of the envelopes 28 can be automatically calculated by the electronic device 70. For example, during a training procedure within the initialization procedure, a user may be prompted to input a desired graphical passcode multiple times. Variations in the characteristic parameters of each multiple iteration inputted in the training session are measured. The envelope size and shape can then be selected by the electronic device so that most or all of the entered graphical passcodes will be authenticated. For example, the variations in the characteristic parameters may be statistically analyzed to generate envelopes which encompass the entered passcodes within a selected tolerance limit (e.g., two-sigma as mentioned earlier). Therefore, if a user has a large variation in a characteristic parameter (e.g. wide variations in applied pressure in nominally identical passcodes), the envelope may be sized to accommodate the variation. Hence, the envelope can be a unique shape for each user. The envelope size can be calculated based on statistical distributions so that an estimated fraction (e.g. 50%, 75%, 90%) of input passcodes will be within the envelope and hence authenticated. For example, FIG. 3A shows plots of pressure vs. time for multiple input passcodes 26a 26b 26c that are each slightly different. In FIG. 3A, a parameter envelope 28 is formed such that all of the measured parameter values of the multiple input passcodes 26a 26b 26c are included within the parameter envelope 28. In this manner, a user may accommodate slight variations in the subsequent inputting of the graphical passcode during each authentication attempt.

Figure 3B:
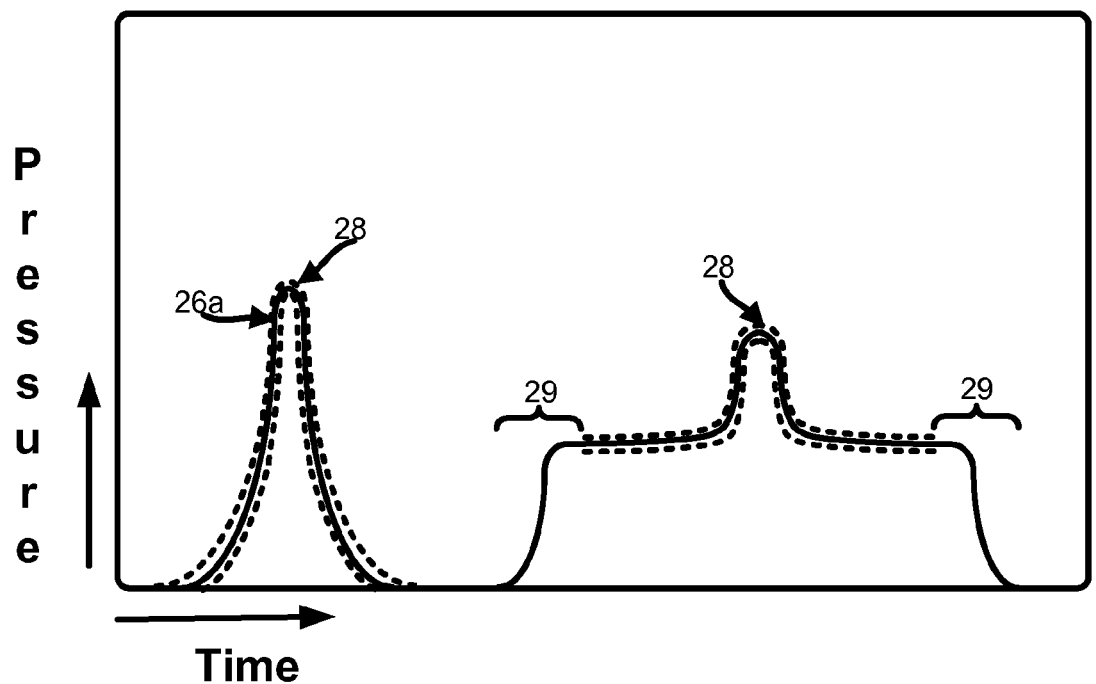
FIG. 3B is a plot illustrating an envelope that has no upper bound, and an envelope that is nonexistent in some regions.

In an alternative embodiment, the envelope may be nonexistent (i.e. infinitely large) in certain regions of time or position. In this case, areas where the envelope does not exist are not used for authentication. The measured parameter value in these areas are immaterial. For example, FIG. 3B shows a graphical passcode where the parameter envelope 28 has no lower or upper boundary for the interval of time indicated by brackets 29. Thus, when comparing a subsequently inputted graphical passcode against the template passcode, any pressure reading during these time intervals will satisfy the authentication process so long as the measured pressure value of the subsequently inputted graphical passcode falls within the parameter envelope 28 where the parameter envelope 28 is defined. No envelope is present in time intervals 29, so the pressure magnitude in the intervals 29 is not needed for authentication. Providing an undefined envelope for portions of the graphical passcode may make it easier for users to enter acceptable passcodes by limiting authentication to portions that are most reproducible and less sensitive to minor variations.

In some embodiments, authentication of the subsequently inputted graphical passcode may employ a measurement of a size (i.e., area) of the object or fingertip applied to the touchsurface. For example, the touchsurface may discriminate between a large fingertip and a small stylus tip, and use this area difference as a measured parameter that can be compared against the template graphical passcode for authentication. Authentication may require a measured contact area greater than or less than a certain size, or within a certain size range. The size requirement can be determined during a training session, or can be predetermined or can be selected by the user.

In an alternative embodiment, the electronic device 70 can provide the user with a starting point or ending point for the graphical passcode. For example, the electronic device 70 may display an "X" or target symbol at the start position or end position of the graphical passcode. This may tend to decrease the authentication failure rate and help the user to more accurately render the graphical passcode in embodiments where template graphical passcode data includes plots of measured pressure and/or speed is plotted against position. By indicating to the user where to start or end the inputted graphical passcode, the user may have an increased authentication rate.

In another alternative embodiment, the electronic device 70 may include an accelerometer for detecting movement. The measurement of movement can be used to correct for errors in graphical passcode rendering. For example, in a bumpy environment (e.g. in a car or vehicle) bumps can cause shaking of the user's hand and the device (relative to a users hand) which consequently affect the input of the graphical passcode. Filtering or removing the component of the subsequently inputted graphical passcode due to shaking will help a user to correctly render the graphical passcode in a bumpy environment. Alternatively, detection of frequent acceleration consistent with a bumpy environment may be used to expand the envelope of the graphical passcode to make it easier for a user to enter a passcode that complies with authentication criteria.

It should be appreciated that parameter envelopes 28 in the time domain (e.g. the pressure vs. time envelope of FIG. 2B) inherently include timing information for the taps and swipes comprising the graphical passcode. Hence, parameter envelopes 28 in the time domain can recognize rhythms in the graphical passcode. In another alternative embodiment, the electronic device 70 may be configured to ignore spatial information (e.g. X and Y coordinate information) and only authenticate information in the time domain. In this case, for example, the correct rhythm and number of taps anywhere on the touchsurface is sufficient for graphical passcode authentication. The location may be immaterial, provided that the taps have the correct timing (i.e. rhythm). Timing can be accurately measured relative to the clock 78.

Figure 4:
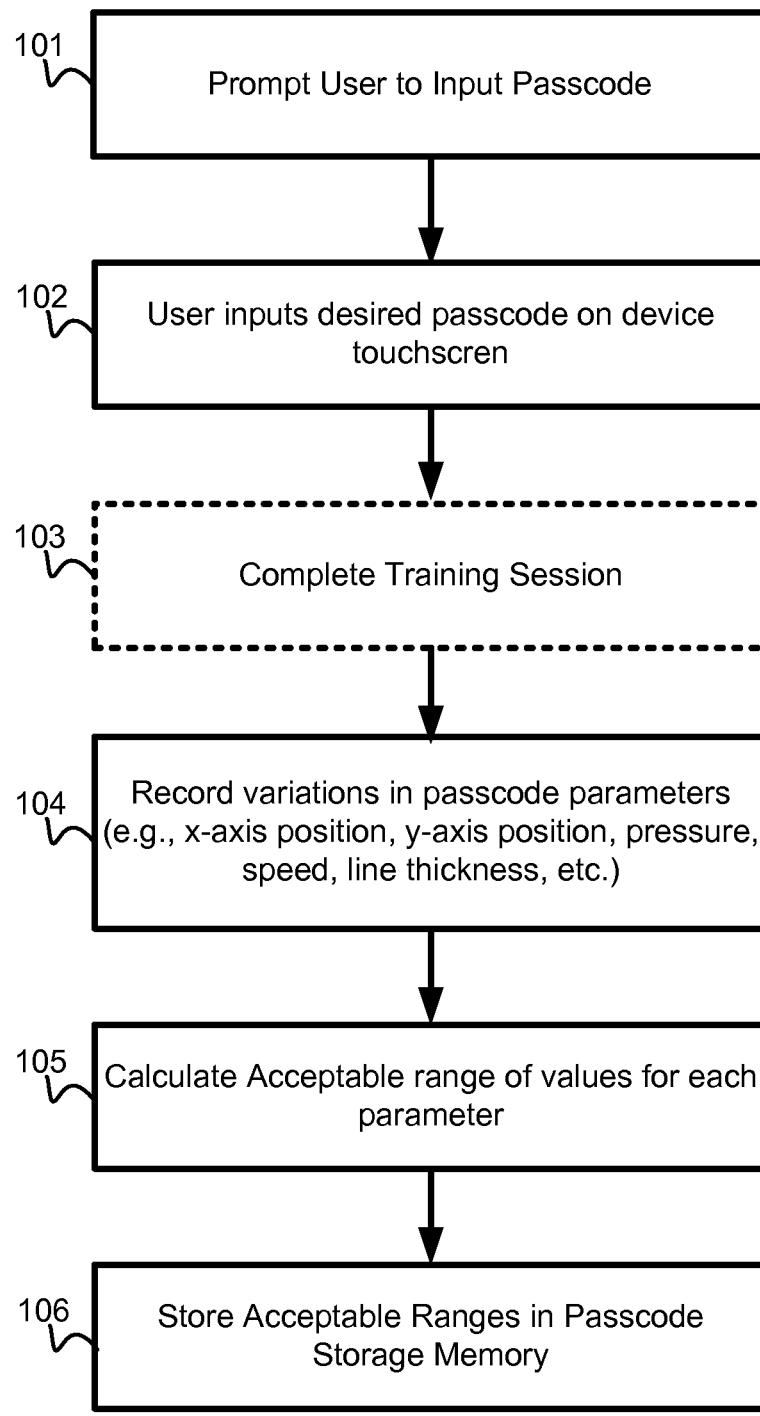
FIG. 4 is a process flow diagram of an embodiment method for creating and storing a desired graphical passcode.

FIG. 4 illustrates a process flow of steps in a method of an embodiment for initializing an electronic device with a template graphical passcode. The electronic device 70 via the processor 71 and display 40 may prompt a user to input a desired graphical passcode, step 101. In response to the prompt, the user inputs a graphical passcode to be used as a passcode template, step 102, such as by drawing a finger tip across the touchsurface in the appropriate manner. The user may optionally be prompted to complete a training session, step 103, where the desired graphical passcode may be inputted multiple times to enable the processor 71 to generate the necessary parameter envelopes 28 circumscribing the passcode template. Alternatively, the user may initiate a training session. The electronic device 70 processor 71 measures at least one characteristic parameter of the inputted template graphical passcode and stores the measured at least one characteristic parameter in the internal memory 72 as at least part of the passcode template, step 104. The measured passcode parameters may include X-axis position, Y-axis position, pressure, speed, line thickness, etc. The characteristic parameter measurements may be measured and stored as a function of time or location. For example, if applied force is measured, then the applied force measured at each time interval is stored in the memory 72. The characteristic parameter measurements may be stored as plotted graphs or as correlated datasets.

The processor 71 may calculate an acceptable envelope or range of values for each characteristic parameter within the passcode template, step 105. A parameter envelope 28 may be implemented as there will naturally be variations each time a user enters a graphical passcode. For example, the applied force will typically not be identical each time a user enters the graphical passcode. The acceptable envelope values can be calculated statistically from multiple training sessions, or can be based on predetermined, estimated amounts of variation. As part of the process of calculating the acceptable envelope, user input may be accepted to adjust the envelope range, allowing users to tighten or loosen the envelope about their passcode baseline. In this manner users can configure the "looseness" of their passcode to make their passcode verification more or less strict. For example, if the envelope is is determined as a multiple of the standard deviations of the measured parameter values, user input may be accepted to adjust the multiple used in this calculation. Some embodiments may optionally forego the use of a parameter envelope. However, in such embodiments any subsequently inputted graphical passcodes must be inputted exactly as the template graphical passcode to be authenticated. Once the acceptable envelope values have been calculated, the acceptable envelope values are stored in the memory 72 as part of the passcode template, step 106. The passcode template and its acceptable envelope values are used by the processor 71 to determine the authenticity of a subsequently inputted graphical passcode.

Figure 5:
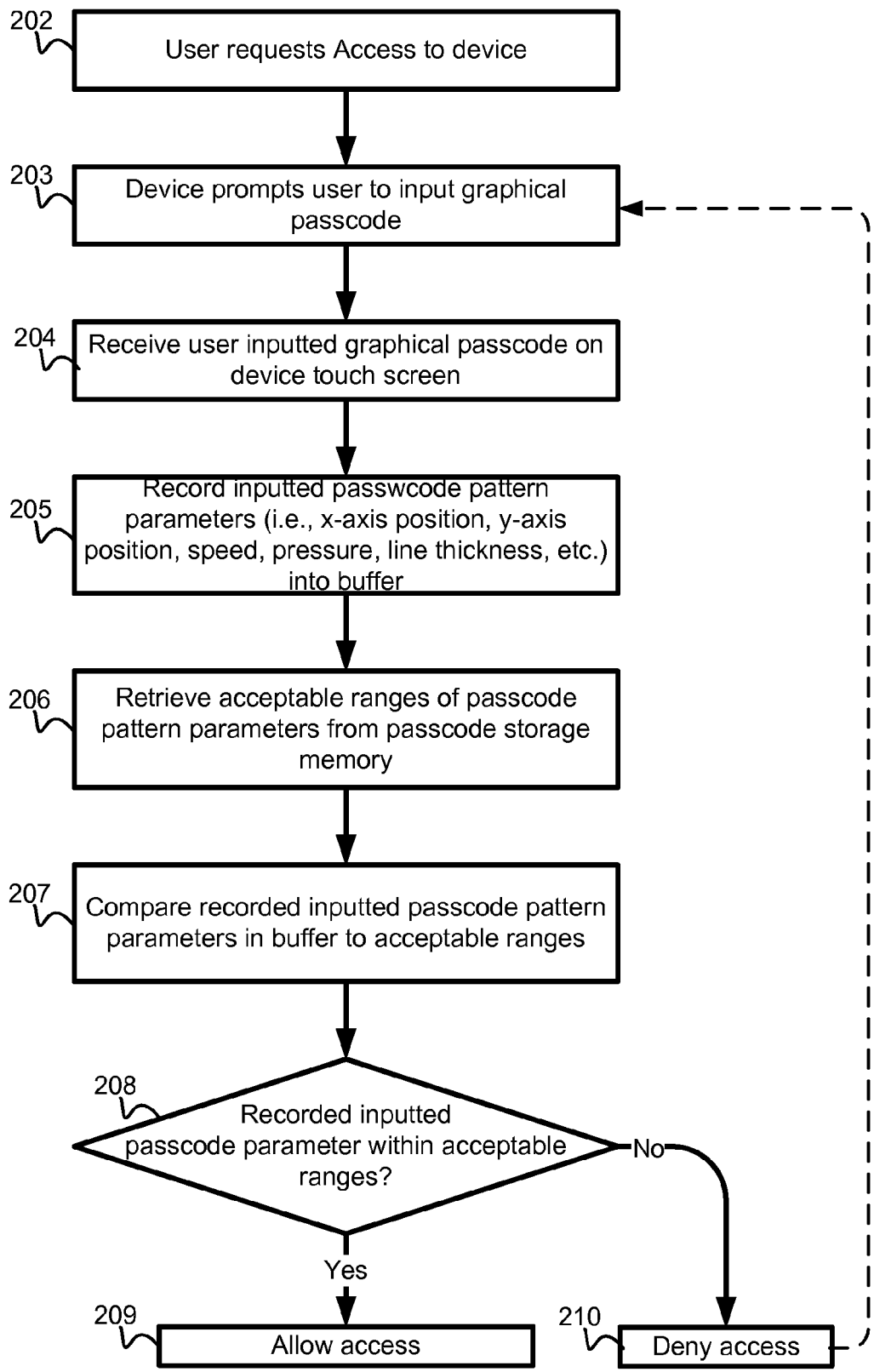
FIG. 5 is a process flow diagram of an embodiment method for authenticating a graphical passcode.

FIG. 5 illustrates a process flow of steps of an embodiment method for using graphical passcodes to gain access to an electronic device. In the embodiment shown in FIG. 5, a user requests access to an electronic device 70 that uses a graphical passcode security system, step 202. The electronic device 7 via the processor 71 and display 40 prompts the user to input a graphical passcode that is being used as an authentication credential, step 203. The user inputs the graphical passcode which is received by the processor 71 via the touchsurface 40, step 204. As the passcode is sketched out on the touchsurface the processor 71 measures various characteristic parameters (e.g. pressure, force, speed, X or Y coordinate data) of the inputted graphical passcode and stores the measured parameter values in a memory buffer, step 205. The measurement of characteristic parameter values may comprise the measurement of raw parameter data which is stored in a table, such as a correlated dataset. Alternatively, various plots of parameter values versus location or time may be generated and stored in the buffer. Once the measured parameters values are stored in a buffer, the passcode template along with the various envelopes of acceptable parameter values for each of the different parameters for the graphical passcode template may be retrieved from memory, step 206. Each of the respective retrieved parameter envelopes defines the range of acceptable values for each time and/or position increment for the respective measured parameter in the passcode. Each of the measured parameter values for the inputted graphical passcode is compared against the respective retrieved parameter envelope of the passcode template, step 207, and a determination is made as to whether the inputted graphical passcode falls within acceptable ranges of the passcode template, decision 208. If each of the respective measured parameter values stored in the buffer is within the range of acceptable values of each respective envelope (i.e., decision 208="Yes"), then access to the electronic device 70 is allowed, step 209. If any or some fraction of the respective measured parameter values stored in the buffer is not within the range of acceptable values of each respective envelope of the passcode template (i.e., decision 208="No"), then access to the electronic device 70 is denied, step 210. If access to the electronic device 70 is denied, the user may optionally be promoted to re-input the graphical passcode, step 203, to repeat steps 203-210.

Figure 6A:
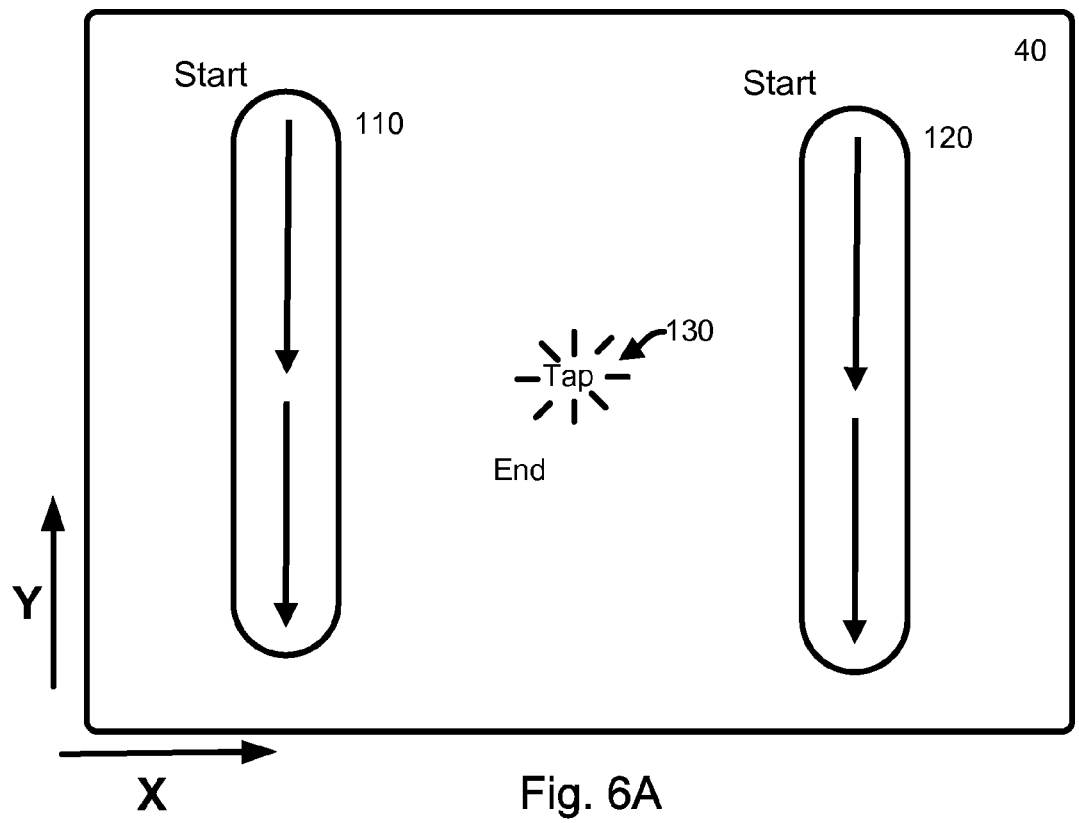
FIG. 6A illustrates a second exemplary graphical passcode.
Figure 6B:
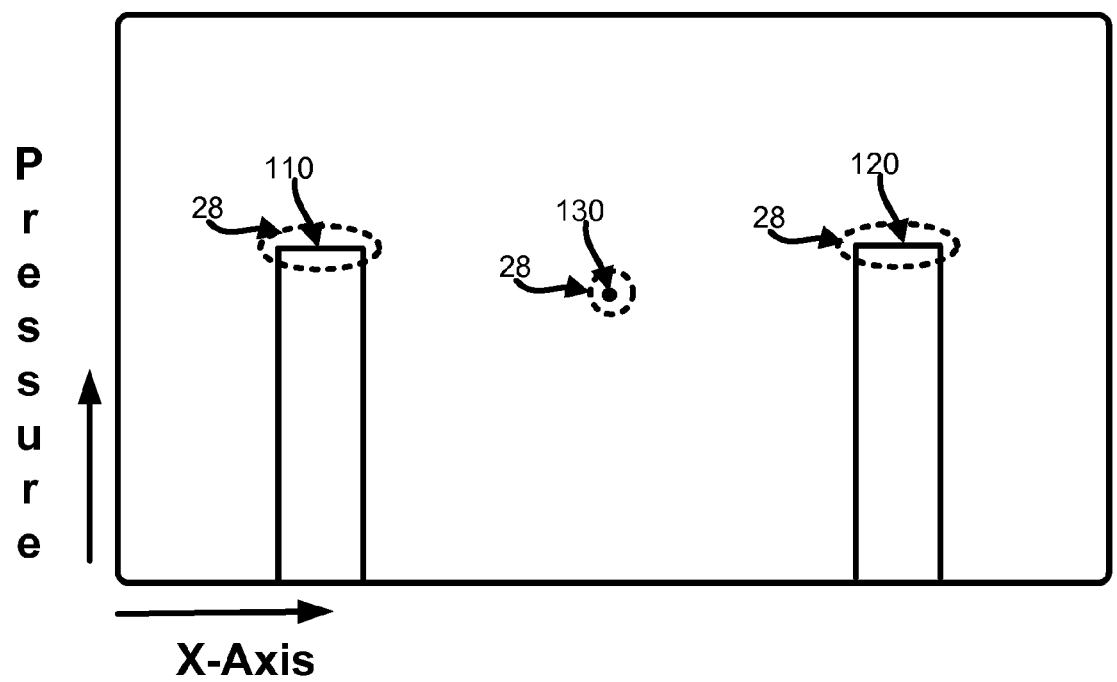
FIGS. 6B-6E are plots illustrating a variety of envelopes for different parameters of the graphical passcode shown in FIG. 6A.
Figure 6C:
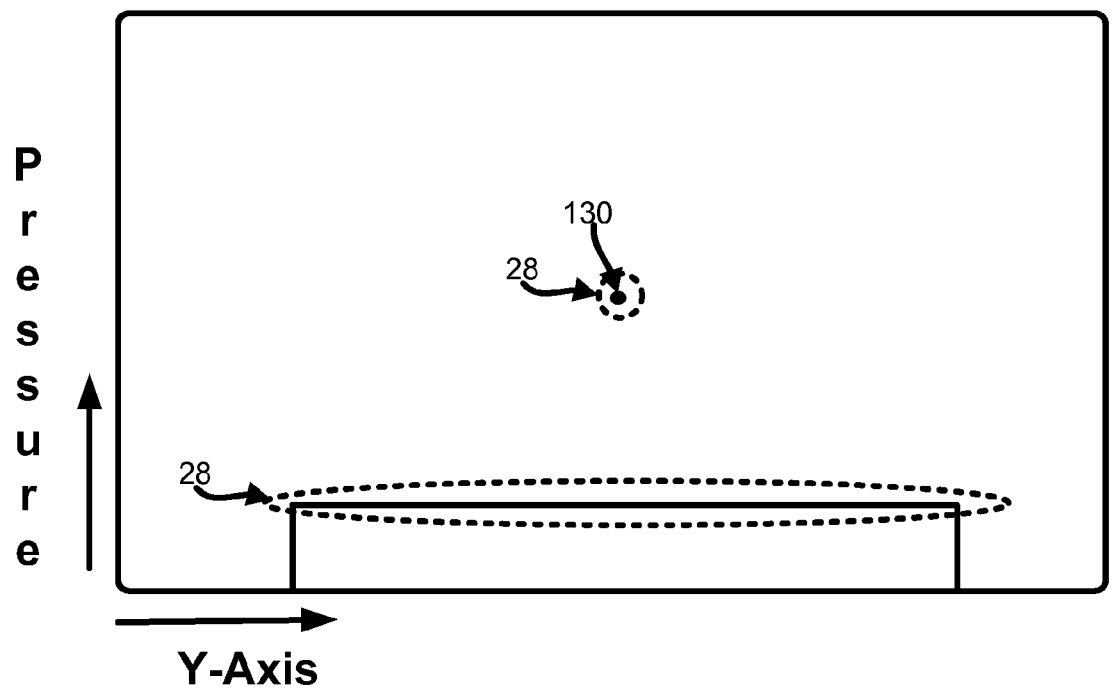

FIG. 6A illustrates another exemplary graphical passcode. FIGS. 6B-6E are plots illustrating various parameter measurements of this graphical passcode as well as exemplary envelopes circumscribing each measured parameter value. The exemplary graphical passcode of FIG. 6A consists of two simultaneous swipes 110, 120 (e.g. made with two fingers), followed by a tap 130 in the middle of the touchsurface. The swipes 110, 120 have a constant speed and pressure. FIG. 6B shows a plot of pressure vs. X-axis position for this example passcode showing the envelopes 28. The two bars correspond to the width and position along the X-axis of swipes 110 and 120. The dot corresponds to the tap 130. It is noted that pressure vs. the X-axis envelopes circumscribe the point corresponding to the tap 130 and circumscribe the top of the bars corresponding to the two swipes 110, 120 since the range of acceptable pressure values for those X-axis positions must be approximate to the magnitude of pressure in which the swipes are inputted. FIG. 6C is a plot of pressure vs. Y-axis position. It is noted that a point corresponding to the tap 130 is plotted above a horizontal bar corresponding to the pressure exerted along swipes 110 and 120 along the Y-axis. Thus, so long as the measured pressure along the Y-axis of the subsequently inputted graphical passcode is of either the magnitude of the tap 130 or either swipe 110, 120 at the given Y-axis position the subsequently inputted graphical passcode may be authenticated.

Figure 6D:
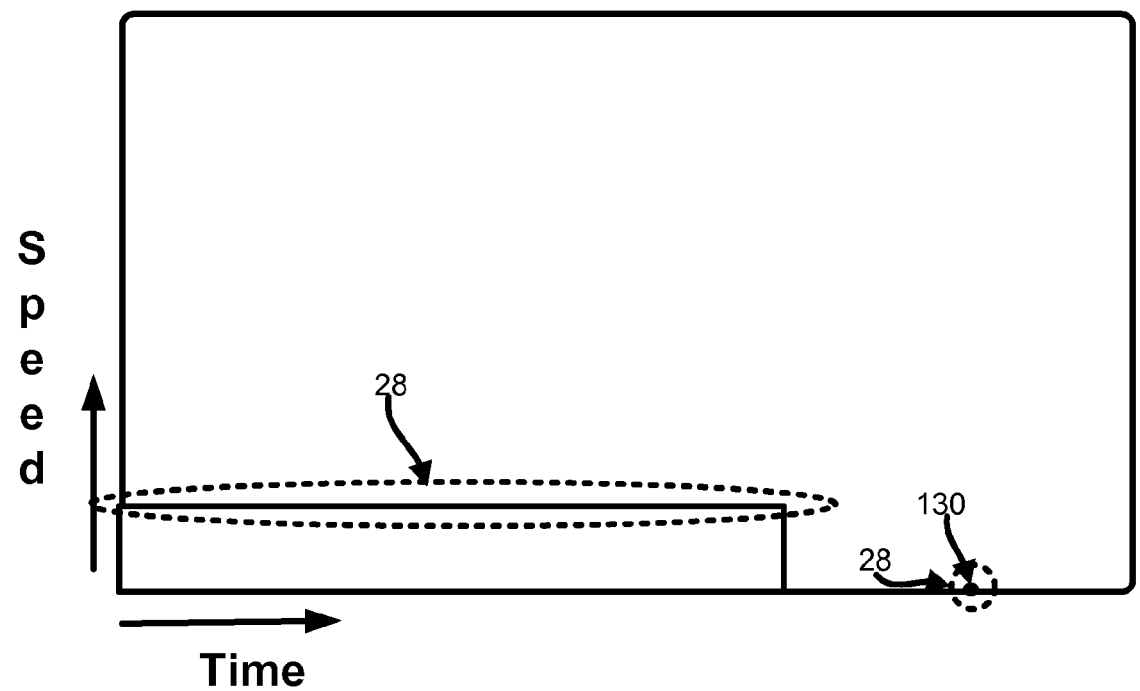
Figure 6E:
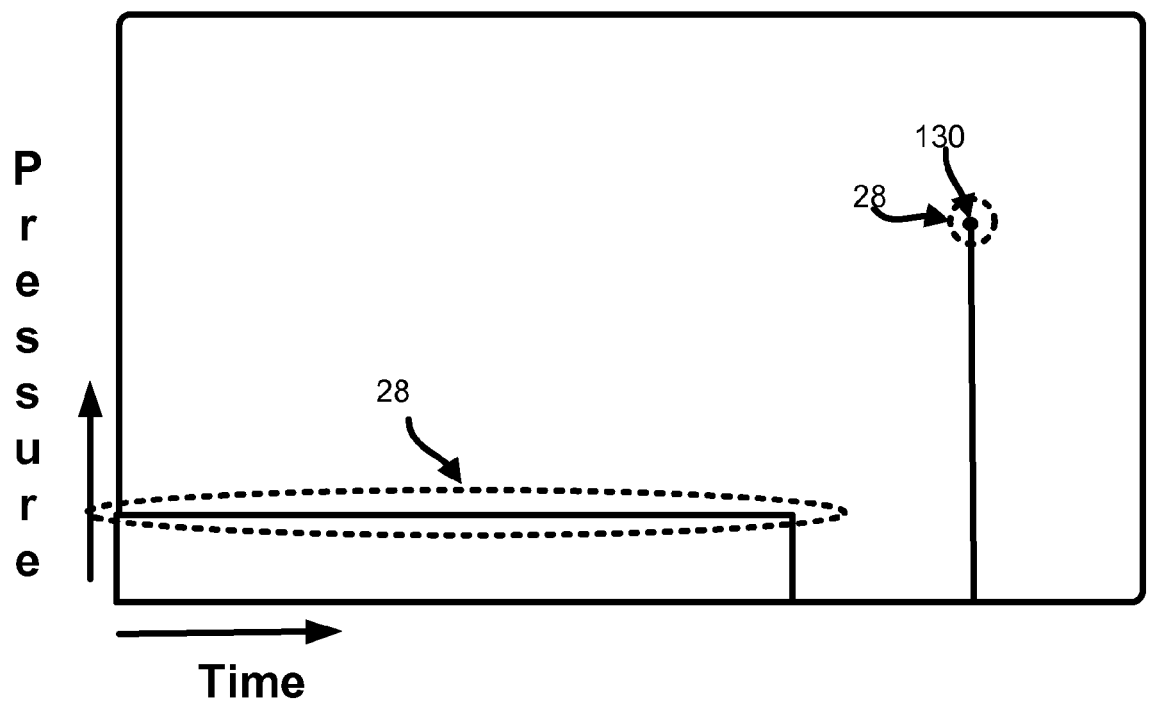

FIG. 6D is a plot of speed vs. time. Since the swipes 110 and 120 are inputted at a constant speed, the plot depicts a bar of constant magnitude as the time where the swipes are inputted elapses. The tap 130 essentially has zero speed since it is not moving. Finally, FIG. 6E is a plot of pressure vs. time. The pressure in FIG. 6E may be pressure that is integrated over the entire touchsurface (i.e. force), or it may be a pressure measurement only over specific regions of the touchsurface. As shown in FIG. 6E, a tap 130 will result in a spike in the plot of pressure versus time.

Figure 7A:
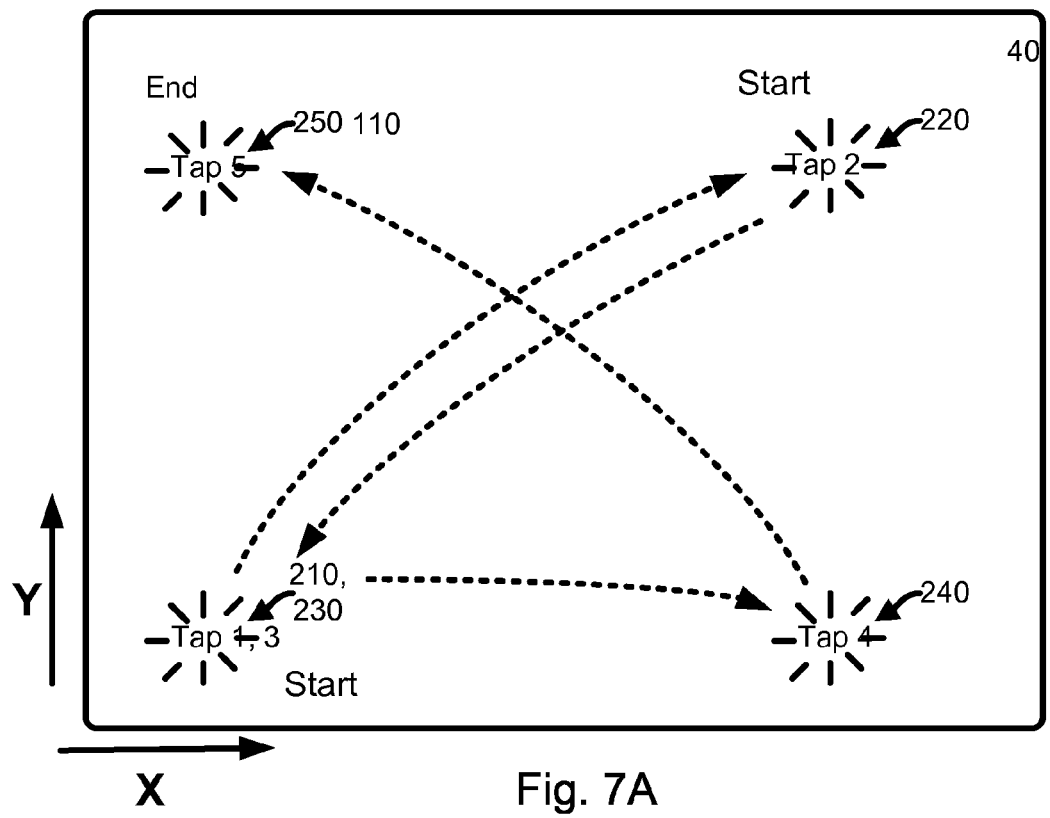
FIG. 7A illustrates a third exemplary graphical passcode.

FIG. 7A illustrates another exemplary graphical passcode. FIGS. 7B-7E are plots illustrating various parameter measurements of the graphical passcode as well as exemplary envelopes circumscribing each measured parameter value. The exemplary graphical passcode of FIG. 7A consists of five taps 210, 220, 230, 240, and 250, in the four corners of the touchsurface performed in the order illustrated by the arrows. Tap #3 230 is of longer duration and is applied at a higher pressure than the other four taps. This is made evident in the plot of pressure versus time in FIG. 7E.

Figure 7B:
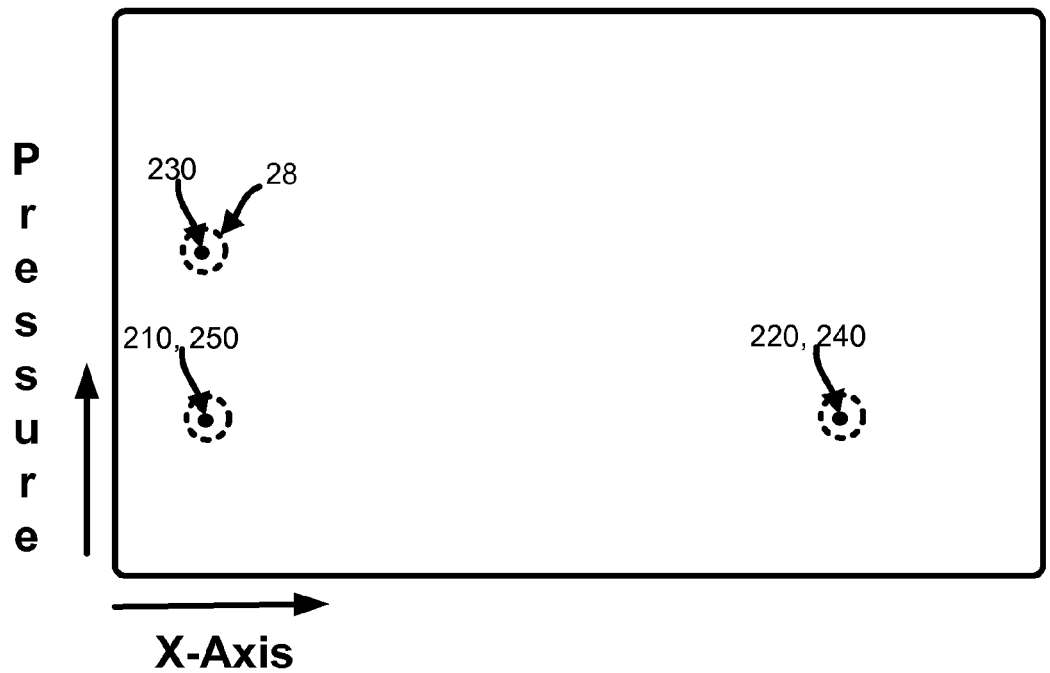
FIGS. 7B-7E are plots illustrating a variety of envelopes for different parameters of the graphical passcode shown in FIG. 7A.

FIG. 7B is a plot of pressure vs. X-axis position, showing the envelopes 28. As described above, because each tap only contacts a point on the touchsurface, the plots of pressure versus X-Axis position (as well as Y-Axis position) will only register a point on the plot. It is noted that because tap #1 and tap #5 share the same pressure magnitude and X-coordinate position, a single point represents both taps#1 and #5 in the plot shown in FIG. 7B. Similarly, a singular point represents taps#2 and #4. Tap#3 shares the same X-coordinate position with Taps#1 and #5, however, because Tap#3 is applied at a higher pressure than the other four taps, another point at a higher pressure is depicted in FIG. 7B to represent Tap#3.

Figure 7C:
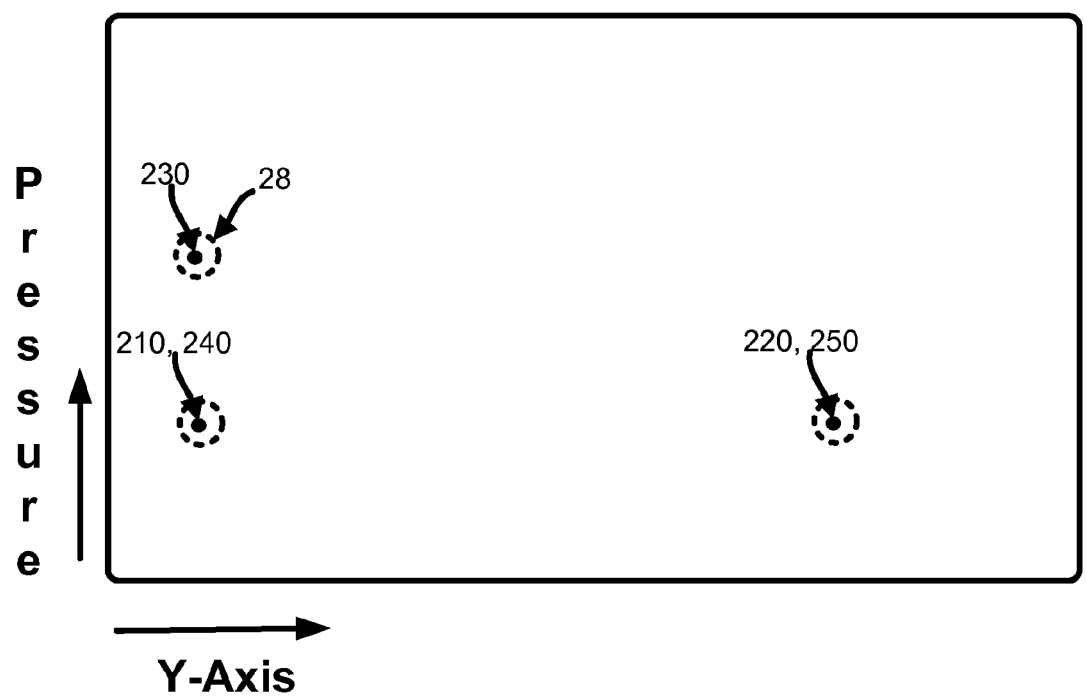

FIG. 7C is a plot of pressure vs. Y-axis position. Similar to FIG. 7B, FIG. 7C depicts three separate points. Because Taps#1 and #4 share the same Y-coordinate position and magnitude of pressure, a singular point is used to represent both taps. Similarly, Taps#2 and #5 share the same Y-coordinate position and magnitude of pressure. Therefore, a singular point is used to represent both Taps#2 and #5. Also, since Tap#3 shares a Y-coordinate position with Taps#1 and #4 but is applied at a higher pressure than all other taps, a separate point having the same Y-coordinate as the point representing Taps#1 and but higher in pressure magnitude is shown in FIG. 7C.

Figure 7D:
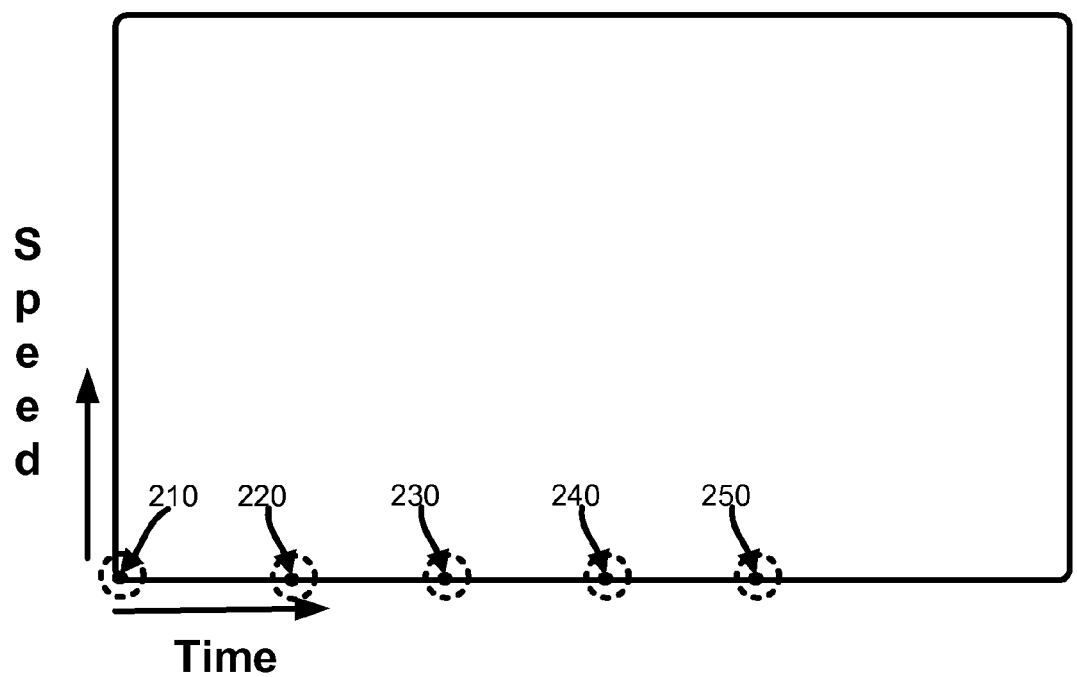

FIG. 7D is a plot of speed vs. time of the graphical passcode illustrated in FIG. 7A. Each of the five taps essentially have zero speed since none of the taps are moving. Accordingly, five separate points are depicted in FIG. 7D with a speed magnitude of zero but along the time axis in accordance to when the taps respectively occur.

Figure 7E:
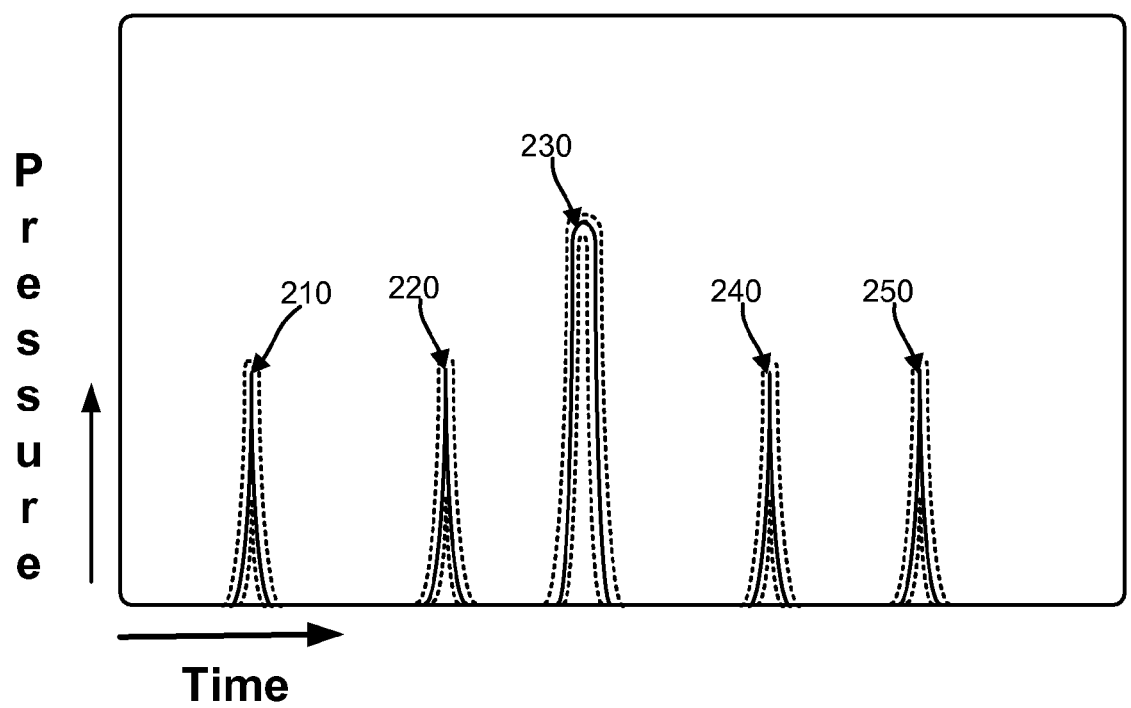

Finally, FIG. 7E is a plot of pressure vs. time for the five taps. As previously described with respect to FIG. 2B, each of taps #1-#5 are not truly instantaneous. Accordingly, the plot of pressure versus time results in a spike for each of the five taps. It is noted that the magnitude of pressure for Tap#3 is shown to be greater than the magnitude of the other four taps, each of which is approximately the same in magnitude. Further, it is noted that Tap#3 is held on the touchsurface 40 for a slightly longer duration of time than the other four taps. This is indicated by the slight wider spike representing Tap#3 as compared to the other four taps.

Figure 8A:
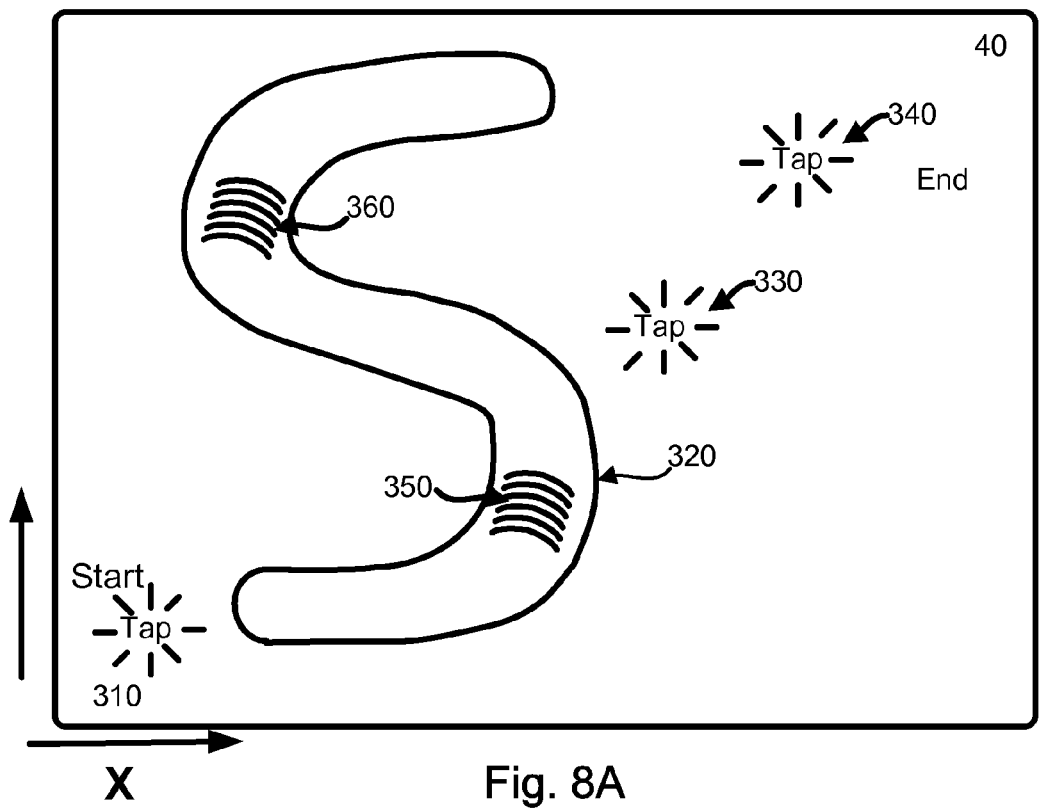
FIG. 8A illustrates a fourth exemplary graphical passcode.

FIG. 8A illustrates another exemplary graphical passcode. FIGS. 8B-8E are plots illustrating various parameter measurements of the graphical passcode as well as exemplary envelopes circumscribing each measured parameter value. The exemplary graphical passcode of FIG. 8A consists of a tap 310 in the lower left portion of the touchsurface 40, followed by an S-shaped swipe 320 that starts at the bottom of the curve and moves upward, followed by two taps 330, 340 in the upper right portion of the touchsurface 40. The swipe 320 has two regions of increased pressure 350, 360, but is inputted at a constant speed.

Figure 8B:
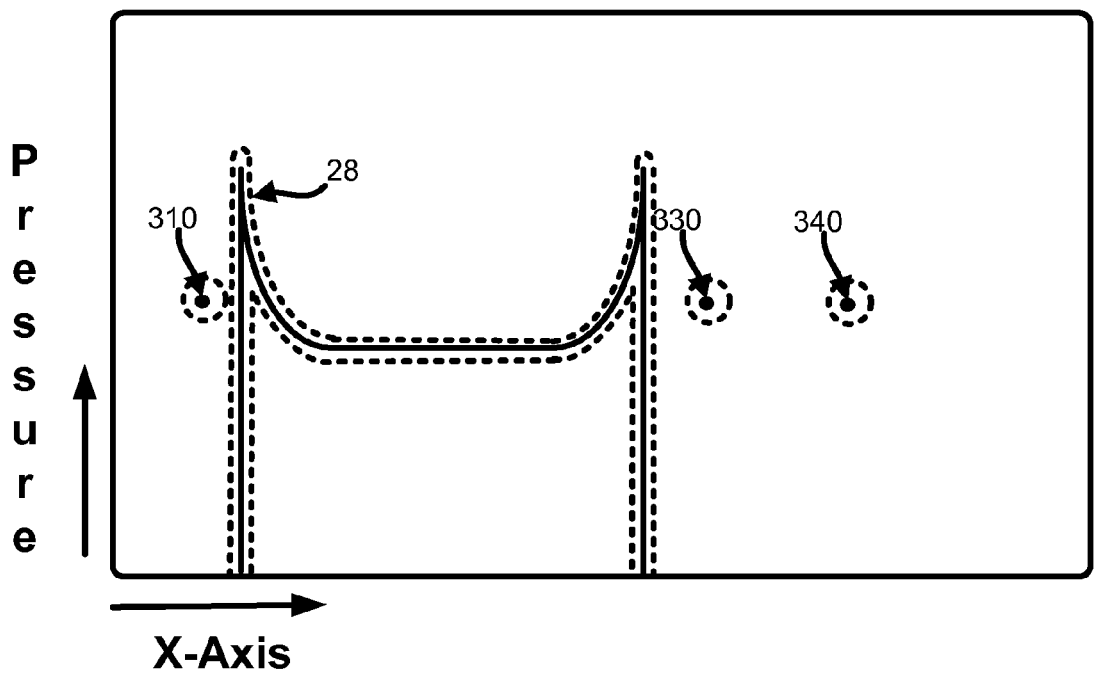
FIGS. 8B-8E are plots illustrating a variety of envelopes for different parameters of the graphical passcode shown in FIG. 8A.

FIG. 8B illustrates a plot of pressure vs. X-axis position for the graphical passcode of FIG. 8A showing the envelopes 28. As above, taps 310, 330, and 340 may be presented in a pressure vs. position plot as a point. The swipe 320 is shown in the pressure vs. X-axis position plot as a box shape with a spike at either end. The spikes at either end represent the areas on the outer curves of the S-shaped swipe 320 that are applied at higher pressures.

Figure 8C:
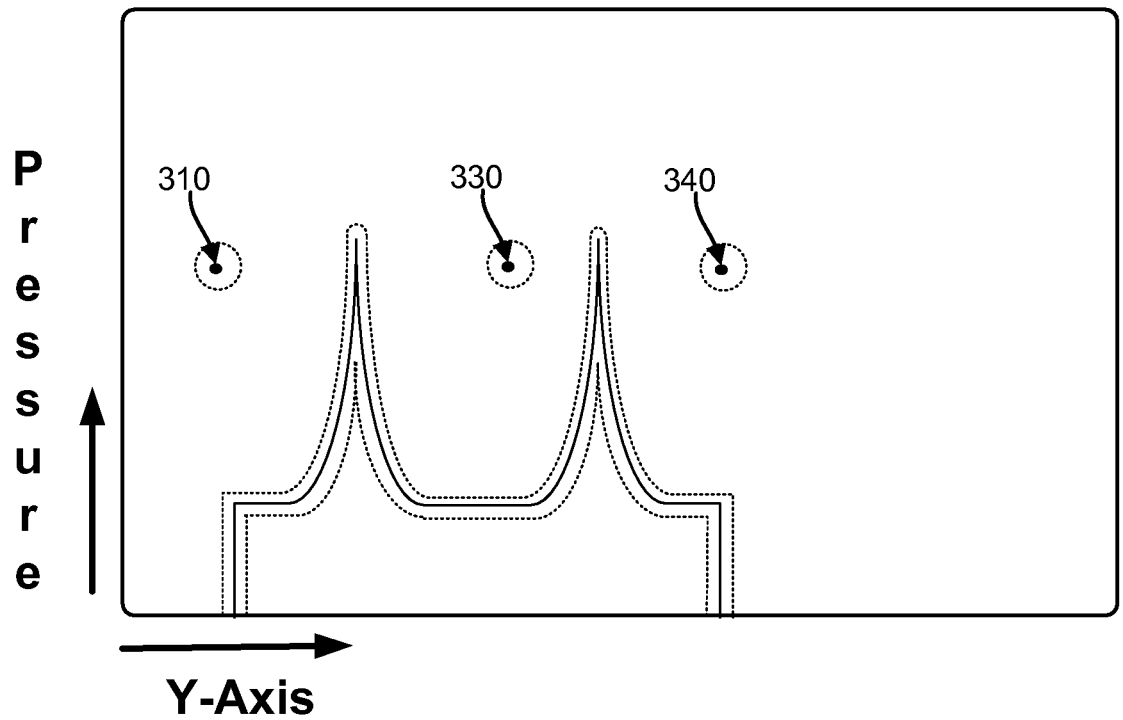

FIG. 8C is a plot of pressure vs. Y-axis position. As above, taps 310, 330, and 340 may be presented in a pressure vs. position plot as a point. The swipe 320 is shown in the pressure vs. Y-axis position plot as a box shape with two spikes corresponding to the Y-axis position of the areas of higher pressure at either end of the S-shaped swipe 320.

Figure 8D:
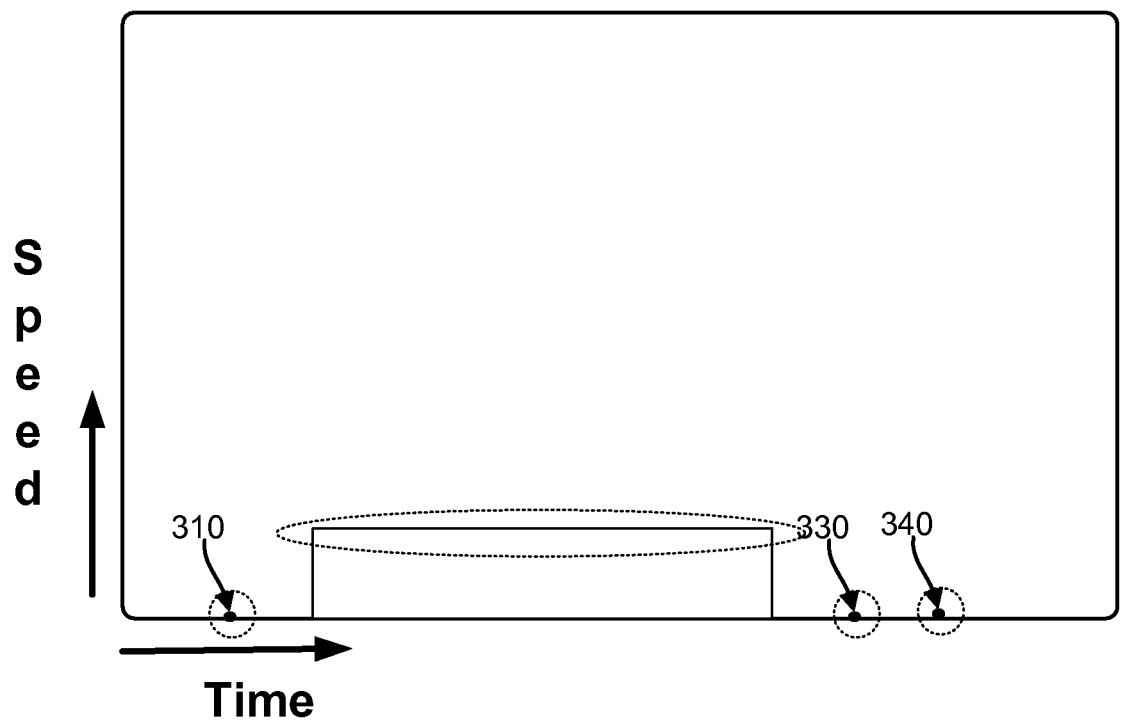

FIG. 8D is a plot of speed vs. time. As above, because the taps 310, 330 and 340 do not move, they record essentially no speed. Consequently, the taps 310, 330, and 340 are represented as points along the time axis with no magnitude component of speed. The swipe 320 is depicted in the plot as a bar having a constant speed for the duration of the swipe.

Figure 8E:
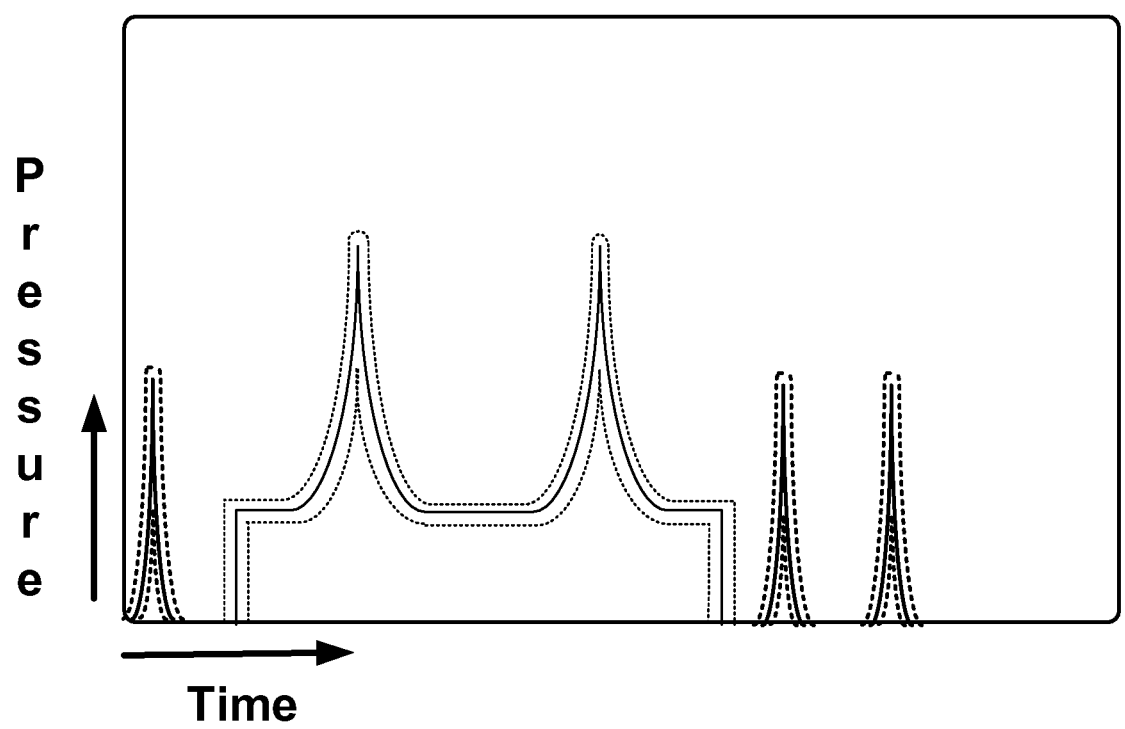

FIG. 8E is a plot of pressure vs. time. As above, each of taps 310, 330 and 340 are not truly instantaneous. Accordingly, the plot of pressure versus time results in a spike for each of the three taps. Furthermore, the plot corresponding to the swipe 320 maintains the box shape with two spikes corresponding to the areas of increased pressure that occur slightly after the swipe 320 is initiated and again slightly before the swipe 320 is terminated.

FIG. 9 illustrates an example of a data table which may be used for storing (e.g. in the computer readable memory) a pressure versus position envelope corresponding to the graphical passcode of FIG. 2A. As depicted in FIG. 9, tap 20a produces pressure signals at position 3 in the X-axis and position 17 in the Y-axis, for example. The data table indicates that the tap 20a is applied with a pressure of 20 PSI. However, the envelope 28 circumscribing the point will authenticate a subsequently inputted graphical passcode if the measured pressure at X-axis position 3 is anywhere between 18 and 22 PSI (20 PSI+/−2 PSI). Swipe 22 corresponds to a pressure envelope at positions 6-16 in the X-axis and 7-15 in the Y-axis, for example. As shown in the table of FIG. 9, the area of increased pressure of the swipe 24 corresponds to the increased pressure measurements at X-coordinate positions 9-13 as well as at Y-axis coordinate positions 9-13. Each X-axis and Y-axis position has an associated range of pressure values, which correspond to the widths of the envelopes in FIG. 2C and FIG. 2D. In the exemplary data table, the range of acceptable values is +/−2 PSI. It is noted that the X-axis and Y-axis coordinate data may be measured relative to the touch-surface boundaries, or relative to a feature (e.g. a start point or end point) of the graphical passcode.

FIG. 10 is an illustrative data table for storing (e.g. in the computer readable memory) a pressure vs. time envelope and a speed vs. time envelope corresponding to the graphical passcode of FIG. 2A. As shown in the data table of FIG. 10, tap 20a produces pressure signals at time 3 ms, and has a speed envelope of +/−2 mm/s. Thus, for any subsequently inputted graphical passcode to be authenticated, the measured value of pressure vs. time must have a minimum pressure of 18 PSI and a maximum pressure of 22 PSI at the relative time 3 ms. If most or all of the measured data points of any subsequently inputted graphical passcode are within the range of values for each data entry shown in the data tables the subsequently inputted graphical passcode may be authenticated. Swipe 22 corresponds to pressure envelope at times 6-16 ms and to a speed envelope at times 6-16 ms. Each time interval has an associated range of pressure values and range of speed values, which correspond to the widths of the envelopes in FIG. 2B and FIG. 2E.

It is noted that envelope data stored in memory can have time or position domain information stored as an unlabeled numerical index or dimensionless quantities. Direct or explicit time units or position units are not required in the present invention or appended claims. For example, the measurable parameters can be stored according to relative or arbitrary indices.

All measured parameters from the entry of a graphical passcode may be stored in a single correlated dataset, such as by using a data table format like that illustrated in FIG. 11. In this example data structure, relative time since the start of a passcode entry measured in milliseconds is used as an independent key for indexing data records containing data fields recording the X-axis position, Y-axis position, pressure and speed. Other parameters may be stored and a different data structure or organization may be used. As FIG. 11 reveals, using time or an arbitrary index, all measured parameters may be stored in compact format within the memory of the electronic device. Using a data structure like this, multiple passcode entries can be stored in memory during a training session, after which individual parameter recordings can be recalled for statistical processing with the results, such as average and acceptable tolerance values, stored in a similar data table as the resulting passcode template. Using a data structure like this, a subsequently entered graphical passcode can be stored and then compared to the passcode template using a simple table look up routine.

Figure 12:
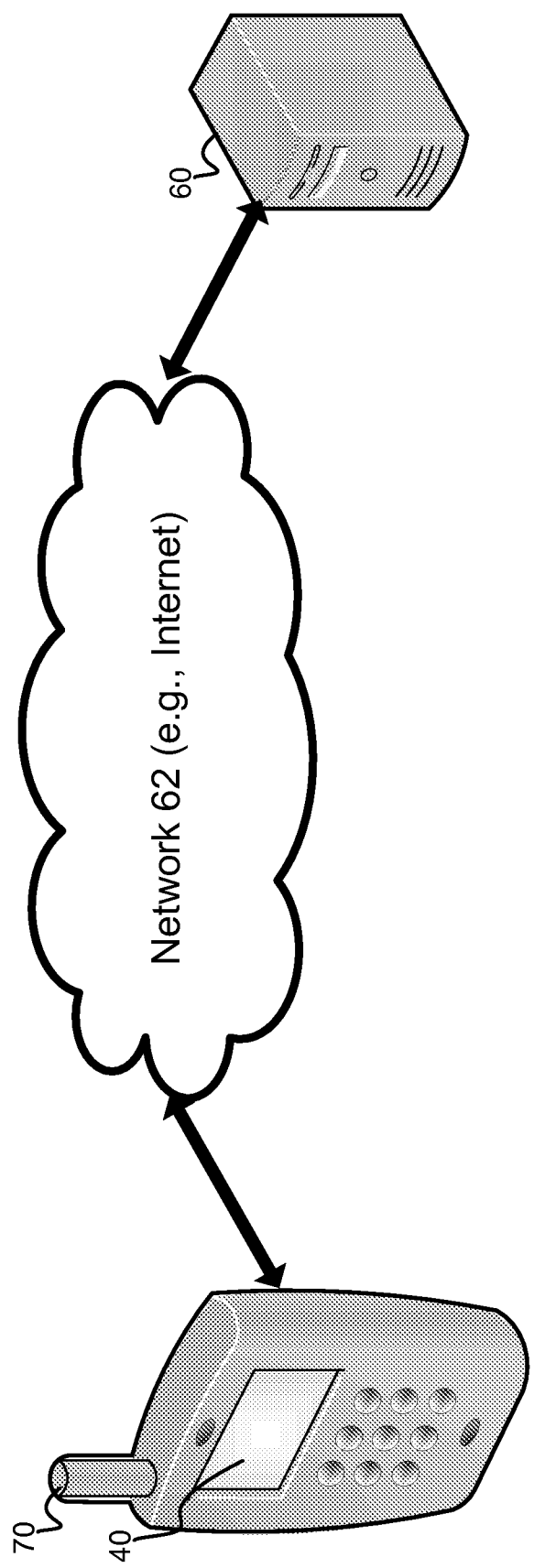
FIG. 12 is an illustration of an electronic device with a touchscreen communicating with a remote authentication server. The remote authentication server authenticates graphical passcodes.

It is noted that the present graphical passcode methods can be implemented on remote devices over a wireless link, network or the Internet. FIG. 12 illustrates an example electronic device 70 with a touchscreen 40 communicating with a remote authentication server 60 via a network 62 such as the Internet. The remote authentication server 60 can be configured with software and passcode templates in order to be able to authenticate graphical passcodes received from the electronic device 70. The device 70 may transmit data describing an input graphical passcode (e.g. the raw graphical passcode data or a correlated dataset such as illustrated in FIG. 11) to the server 60 where authentication is performed. In this way, graphical passcodes can be used to identify persons or machines to remote servers, networks or websites. For example, a person accessing a remote website (e.g. using a laptop computer with a touchsurface) can be authenticated using the present graphical passcode methods and systems.

The present graphical passcodes can be used in the same manner that conventional passwords, security codes or personal identifiers are currently used. For example, the passcodes can be used to lock or unlock an electronic device, provide or deny access to specific files or documents, operate a mechanical lock or vehicle, or identify an individual to an electronic device, network, or website.

The hardware used to implement the forgoing embodiments may be processing elements and memory elements configured to execute a set of instructions, wherein the set of instructions are for performing method steps corresponding to the above methods. Alternatively, some steps or methods may be performed by circuitry that is specific to a given function.

Figure 13:
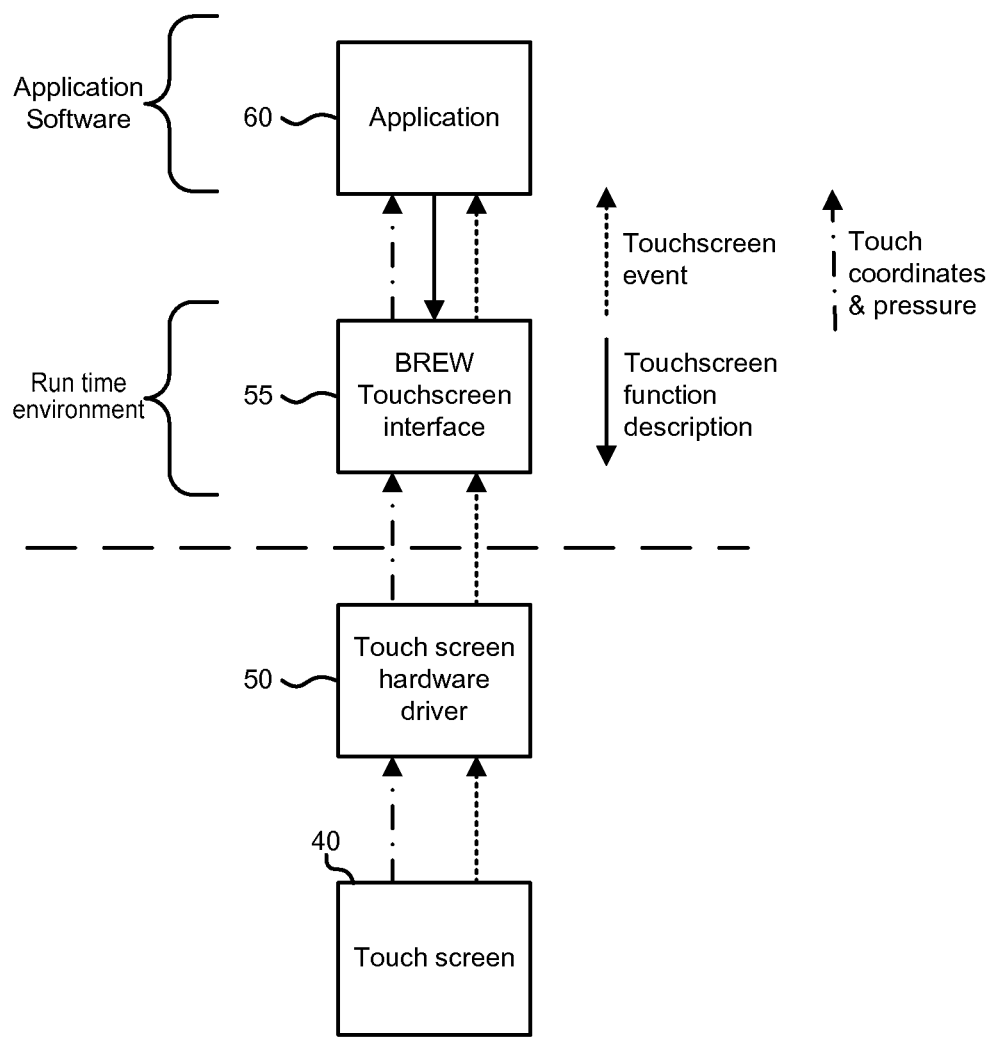
FIG. 13 is a software hardware architecture of an electronic device with a touchscreen display.

FIG. 13 illustrates a hardware software architecture of an electronic device 70 related to relating parameter data to inputs on the touchscreen 40. Touchscreen 40 may implement a variety of different technologies. These may include resistive, Surface Acoustic Wave, Capacitive, Infrared, Strain Gauge, Optical Imaging, Dispersive Signal technology, acoustic pulse recognition, and frustrated total internal reflection. For example, the touchscreen 40 may be a resistive touch screen panel which is composed of several layers including two thin metallic electrically conductive and resistive layers separated by a thin space. When some object touches this kind of touch panel, the layers are connected at certain point; the panel then electrically acts similar to two voltage dividers with connected outputs. This causes a change in the electrical current which is registered as a touch event and sent to the controller for processing. When measuring press force, it is useful to add resistor dependent on force in this model—between the dividers. Alternatively, the touchscreen 40 may utilize Surface Acoustic Wave technology which uses ultrasonic waves that pass over the touch screen panel. When the panel is touched, a portion of the wave is absorbed. This change in the ultrasonic waves registers the position of the touch event and sends this information to the controller for processing. Other alternatives include a capacitive touch screen which is coated with a material that conducts a continuous electrical current across the sensor. When the sensor's 'normal' capacitance field (its reference state) is altered by another capacitance field, i.e., someone's finger, electronic circuits located at each corner of the panel measure the resultant 'distortion' in the sine wave characteristics of the reference field and send the information about the event to the controller for mathematical processing.

Regardless of which particular touchscreen technology is implemented, when a user touches a particular point on the touchscreen 40 panel, an electrical signal may be sensed and converted into an interrupt signal by a hardware driver layer 50. The hardware driver 50 is a firmware program that converts signals from the touchscreen 40 into data signals which can be stored and interpreted by software applications. The hardware driver layer 50 may compare the location, pressure, width of the interrupt signal to generate a coded signal representative of the touchscreen input from the user. A touchscreen hardware driver layer 50 may be in communication with any of a variety of application development platforms 55 which may translate the coded signal to a useful input of any of a number of program applications designed to run on the application development platform 55. For example, the Binary Runtime Environment for Wireless (BREW®) is an application development platform 55 that can download and run a number of applications on mobile devices. The touchscreen hardware driver 50 receives the bit codes output from the touchscreen 40 and output messages that are interpretable by applications 60 running on the mobile device via the application development platform layer 55.

Different applications may interpret touchscreen events in different ways consistent with the functions of the application. For example, text entry may be accomplished with a form of shorthand touchscreen stroke movements, wherein a different series of stroke movements may represent different letters of the alphabet. For example, Graffiti® is a handwriting recognition software application which translates received touchscreen stroke movements into letters of the alphabet. The touchscreen hardware driver 50 may pass the touchscreen events to an application 60 via the application development platform 55 to determine whether specific touchscreen stroke movements have been remapped by a specific application 60.

The various embodiments may be implemented by the processor 71 executing software instructions configured to implement one or more of the described methods. Such software instructions may be stored in memory 72 as the device's operating system, a series of APIs implemented by the operating system, or as compiled software implementing an embodiment method. Further, the software instructions may be stored on any form of tangible processor-readable memory, including: a random access memory module, such as memory chip 72 within the system or an external memory chip such as a USB-connectable external memory (e.g., a "flash drive"); read only memory; hard disc memory device; a floppy disc; and a compact disc.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in processor readable memory which may be any of RAM memory, flash memory, ROM memory, EPROM memory, EEPROM memory, registers, hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

I claim:

1. A method for limiting access to an asset, comprising:
    creating a graphical passcode by:
    receiving, via a touchsurface, a plurality of inputted graphical passcodes from a user to be used in generating a passcode template, wherein each graphical passcode comprises at least one swipe and at least one tap;
    for each of the plurality of inputted graphical postcodes:
    measuring various parameter values associated with each touchsurface touch of the inputted graphical passcode, the various parameters comprising time, X-axis position, Y-axis position and one or more of pressure, speed, and contact area; and
    storing the measured parameter values in memory;
    analyzing the stored measured parameter values of each of the plurality of inputted graphical passcodes to determine baseline passcode parameters and an envelope about x-axis position and y-axis position baseline passcode parameters that circumscribes at least a portion of the plurality of inputted graphical passcodes,
    storing in memory the baseline passcode parameters and envelope to be used as the passcode template; receiving via the touchsurface a subsequently inputted graphical passcode from the user; measuring various parameter values associated with each touchsurface touch of the subsequently inputted graphical passcode, the various parameters comprising time, X-axis position, Y-axis position and one or more of pressure, speed, and contact area;
    expanding the envelope of the graphical passcode upon detection of acceleration consistent with a bumpy environment to make it easier for a user to enter a passcode that complies with authentication criteria;
    comparing the measured parameter values of the subsequently inputted graphical passcode to the passcode template stored in memory;
    and granting access to the asset if the measured parameter values of the subsequently inputted graphical passcode substantially matches the passcode template, wherein the subsequently inputted graphical passcode substantially matches the passcode template when the subsequently inputted graphical passcode parameters fall within the stored envelope.

2. The method of claim 1 wherein one or more of X-axis position, Y-axis position, pressure, speed, and contact area parameter values are measured as a function of time.

3. The method of claim 1, further comprising:
    transmitting the measured parameter values of the subsequently inputted graphical passcode to a remote processor, wherein the step of comparing the measured parameter values of the subsequently inputted graphical passcode to the passcode template is performed by the remote processor and the passcode template is stored in memory of the remote processor; and
    receiving a signal from the remote processor indicating whether access to the asset is granted or denied.

4. The method of claim 3, wherein the asset is the remote processor.

5. The method of claim 1, wherein the asset is an electronic device and the passcode template is stored in memory of the electronic device.

6. The method of claim 1, wherein:
    analyzing the stored measured parameter values of each of the plurality of inputted graphical passcodes comprises statistically analyzing the measured parameter values to define average parameter values and standard deviations of the measured parameter values;
    the baseline passcode parameters are determined as the average parameter values; and
    the envelope about the baseline passcode parameters is determined as a multiple of the standard deviations of the measured parameter values.

7. The method of claim 1, wherein the envelope is defined over a time domain.

8. The method of claim 1, wherein the envelope is defined over a position domain.

9. The method of claim 1 wherein the various parameter values are measured as a function of position on the touchsurface.

10. The method of claim 1, further comprising:
    receiving a user input to adjust the envelop about the baseline passcode parameters; and
    adjusting the envelope about the baseline passcode parameters based on the received user input before storing the envelope in memory.

11. The method of claim 6, further comprising:
    receiving a user input to adjust the envelop about the baseline passcode parameters; and
    adjusting the multiple of the standard deviations of the measured parameter values used to calculate the envelope before storing the envelope in memory.

12. A method for authenticating a client at a server; comprising:
    receiving from the client a plurality of graphical passcode datasets to be used in generating a passcode template for authenticating the client, wherein each graphical passcode dataset comprises parameters of time, X-axis position, Y-axis position and one or more of pressure, speed, and contact area, wherein each graphical passcode comprises at least one swipe and at least one tap;
    analyzing the received plurality of graphical passcode datasets to determine baseline passcode parameters and an envelope about x-axis position and y-axis position baseline passcode parameters that circumscribes at least a portion of the plurality of graphical passcode datasets
    storing in server memory the baseline passcode parameters and the envelope to be used as the passcode template;
    receiving subsequent graphical passcode data from the client, the subsequent graphical passcode data including measurements of various parameters associated with a subsequent graphical passcode that is received by a touchsurface coupled to the client, the various parameters comprising time, X-axis position, Y-axis position and one or more of pressure, speed, and contact area;
    expanding the envelope of the graphical passcode upon detection of acceleration consistent with a bumpy environment to make it easier for a user to enter a passcode that complies with authentication criteria;

comparing the received subsequent graphical passcode data to the passcode template stored in memory of the server;

and authenticating the client if the subsequent graphical passcode data substantially matches the passcode template, wherein the subsequent graphical passcode data substantially matches the passcode template when the subsequent graphical passcode parameters fall within the stored envelope.

13. The method of claim 12, wherein the plurality of graphical passcode datasets includes one or more of X-axis position, Y-axis position, pressure, speed, and contact area parameter values measured as a function of time.

14. The method of claim 12, wherein:
analyzing the received plurality of graphical passcode datasets comprises statistically analyzing the graphical passcode datasets to define average parameter values and standard deviations of the measured parameter values;
the baseline passcode parameters are determined as the average parameter values; and
the envelope about the baseline passcode parameters is determined as a multiple of the standard deviations of the measured parameter values.

15. The method of claim 14, wherein the envelope is defined over a time domain.

16. The method of claim 14, wherein the envelope is defined over a position domain.

17. The method of claim 12, further comprising:
receiving a user input to adjust the envelop about the baseline passcode parameters; and
adjusting the envelope about the baseline passcode parameters based on the received user input before storing the envelope in memory.

18. The method of claim 14, further comprising:
receiving a user input to adjust the envelop about the baseline passcode parameters; and
adjusting the multiple of the standard deviations of the measured parameter values used to calculate the envelope before storing the envelope in memory.

19. An electronic device, comprising: a processor;
a touchsurface coupled to the processor, the touchsurface configured to measure touches to the touchsurface and send measurement signals to the processor; an accelerometer coupled to the processor; and a memory coupled to the processor, wherein the processor is configured with software instructions to perform steps comprising:
creating a graphical passcode by:
receiving, via a touchsurface, a plurality of inputted graphical passcodes from a user to be used in generating a passcode template, wherein each graphical passcode comprises at least one swipe and at least one tap;
for each of the plurality of inputted graphical passcodes:
measuring various parameter values associated with each touchsurface touch of the inputted graphical passcode, the various parameters comprising time, X-axis position, Y-axis position and one or more of pressure, speed, and contact area, and
storing the measured parameter values in memory;
analyzing the stored measured parameter values of each of the plurality of inputted graphical passcodes to determine baseline passcode parameters and an envelope about x-axis position and y-axis position baseline passcode parameters that circumscribes at least a portion of the plurality of inputted graphical passcodes,
storing in memory the baseline passcode parameters and envelope to be used as the passcode template;

receiving via a touchsurface a subsequently inputted graphical passcode from the user;
measuring various parameter values associated with each touchsurface touch of the subsequently inputted graphical passcode, the various parameters comprising time, X-axis position, Y-axis position and one or more of pressure, speed, and contact area;
expanding the envelope of the graphical passcode upon detection of acceleration consistent with a bumpy environment to make it easier for a user to enter a passcode that complies with authentication criteria;
comparing the measured parameter values of the subsequently inputted graphical passcode to the passcode template stored in memory;
and
granting access to the asset if the measured parameter values of the subsequently inputted graphical passcode substantially matches the passcode template, wherein the subsequently inputted graphical passcode substantially matches the passcode template when the subsequently inputted graphical passcode parameters fall within the stored envelope.

20. The electronic device of claim 19, wherein the processor is configured with software instructions to perform steps comprising measuring one or more of X-axis position, Y-axis position, pressure, speed, and contact area parameter values as a function of time.

21. The electronic device of claim 19, wherein the processor is configured with software instructions to perform further steps comprising:
transmitting the measured parameter values of the subsequently inputted graphical passcode to a remote processor, wherein the step of comparing the measured parameter values of the subsequently inputted graphical passcode to the passcode template is performed by the remote processor and the passcode template is stored in memory of the remote processor; and
receiving a signal from the remote processor indicating whether access to the asset is granted or denied.

22. The electronic device of claim 19, wherein:
analyzing the stored measured parameter values of each of the plurality of inputted graphical passcodes comprises statistically analyzing the measured parameter values to define average parameter values and standard deviations of the measured parameter values;
the baseline passcode parameters are determined as the average parameter values; and
the envelope about the baseline passcode parameters is determined as a multiple of the standard deviations of the measured parameter values.

23. The electronic device of claim 22, wherein the envelope is defined over a time domain.

24. The electronic device of claim 22, wherein the envelope is defined over a position domain.

25. The electronic device of claim 19, wherein the processor is configured with software instructions to perform further steps comprising:
receiving a user input to adjust the envelop about the baseline passcode parameters; and
adjusting the envelope about the baseline passcode parameters based on the received user input before storing the envelope in memory.

26. The electronic device of claim 22, wherein the processor is configured with software instructions to perform further steps comprising:
receiving a user input to adjust the envelop about the baseline passcode parameters; and adjusting the multiple of the standard deviations of the measured parameter values used to calculate the envelope before storing the envelope in memory.

27. The electronic device of claim 22, wherein the various parameter values are measured as a function of position on the touchsurface.

28. The electronic device of claim 19, wherein the touchsurface is a touchscreen.

29. The electronic device of claim 19, wherein the touchsurface is a touchpad coupled to the electronic device.

30. A server, comprising: a processor; a network connection coupled to the processor; and a server memory coupled to the processor, an accelerometer coupled to the processor;
wherein the processor is configured with software instructions to perform steps comprising:
receiving via the network connection a plurality of graphical passcode datasets to be used in generating a passcode template for authenticating a client;
analyzing the received plurality of graphical passcode datasets to determine baseline passcode parameters and an envelope about x-axis position and y-axis position baseline passcode parameters that circumscribes at least a portion of the plurality of graphical passcode datasets, wherein the envelope is undefined for portions of the passcode template that are less reproducible and more sensitive to minor variations;
storing in the server memory the baseline passcode parameters and envelope to be used as the passcode template;
receiving subsequent graphical passcode data from the client via the network connection, the subsequent graphical passcode data including measurements of various parameters associated with the subsequent a graphical passcode that is received by a touchsurface coupled to the client, the various parameters comprising time, X-axis position, Y-axis position and one or more of speed, and contact area;
expanding the envelope of the graphical passcode upon detection of acceleration consistent with a bumpy environment to make it easier for a user to enter a passcode that complies with authentication criteria;
comparing the received subsequent graphical passcode data to the passcode template stored in memory of the server;
and
authenticating the client if the subsequent graphical passcode data substantially matches the passcode template, wherein the subsequent graphical passcode data substantially matches the passcode template when the subsequent graphical passcode parameters fall within the stored envelope.

31. The server of claim 30, wherein the received plurality of graphical passcode datasets includes one or more of X-axis position, Y-axis position, pressure, speed, and contact area parameter values measured as a function of time.

32. The server of claim 30, wherein:
analyzing the received plurality of graphical passcode datasets comprises statistically analyzing the plurality of graphical passcode datasets to define average parameter values and standard deviations of the parameter values;
the baseline passcode parameters are determined as the average parameter values; and
the envelope about the baseline passcode parameters is determined as a multiple of the standard deviations of the parameter values.

33. The server of claim 32, wherein the envelope is defined over a time domain.

34. The server of claim 32, wherein the envelope is defined over a position domain.

35. The server of claim 30, wherein the processor is configured with software instructions to perform further steps comprising:
receiving a user input to adjust the envelop about the baseline passcode parameters; and
adjusting the envelope about the baseline passcode parameters based on the received user input before storing the envelope in memory.

36. The server of claim 32, wherein the processor is configured with software instructions to perform further steps comprising:
receiving a user input to adjust the envelop about the baseline passcode parameters; and
adjusting the multiple of the standard deviations of the measured parameter values used to calculate the envelope before storing the envelope in memory.

37. An electronic device, comprising:
means for receiving via a touchsurface a plurality of inputted graphical passcodes from a user to be used in generating a passcode template, wherein each graphical passcode comprises at least one swipe and at least one tap;
means for measuring various parameter values associated with each touchsurface touch of the inputted graphical passcode, the various parameters comprising time, X-axis position, Y-axis position and one or more of pressure, speed, and contact area; means for storing the measured various parameter values; means for analyzing the stored measured parameter values of each of the plurality of inputted graphical passcodes to determine baseline passcode parameters and an envelope about x-axis position and y-axis position baseline passcode parameters that circumscribes at least a portion of the plurality of inputted graphical passcodes,
means for storing the baseline passcode parameters and envelope to be used as the passcode template;
means for receiving a subsequently inputted graphical passcode from the user; means for measuring various parameter values associated with each touchsurface touch of the subsequently inputted graphical passcode, the various parameters comprising time, X-axis position, Y-axis position and one or more of pressure, speed, and contact area;
means for expanding the envelope of the graphical passcode upon detection of acceleration consistent with a bumpy environment to make it easier for a user to enter a passcode that complies with authentication criteria;
means for comparing the measured parameter values of the subsequently inputted graphical passcode to the passcode template stored in memory; and
means for granting access to the asset if the measured parameter values of the subsequently inputted graphical passcode substantially matches the passcode template, wherein the subsequently inputted graphical passcode substantially matches the passcode template when the subsequently inputted graphical passcode parameters fall within the stored envelope.

38. The electronic device of claim 37, wherein means for measuring various parameter values measures one or more of X-axis position, Y-axis position, pressure, speed, and contact area parameter values as a function of time.

39. The electronic device of claim 38, further comprising:
means for transmitting the measured parameter values of the subsequently inputted graphical passcode to the means for comparing the measured parameter values of the subsequently inputted graphical passcode to a passcode template, wherein the means for comparing the measured parameter values of the subsequently inputted graphical passcode to a passcode template is remotely located and the passcode template is stored in memory of the means for comparing the measured parameter values of the subsequently inputted graphical passcode to a passcode template; and means for receiving a signal from the remote processor indicating whether access to the electronic device is granted or denied.

40. The electronic device of claim 37, wherein:

means for analyzing the stored measured various parameter values of each of the plurality of inputted graphical passcodes further comprises means for statistically analyzing the measured various parameter values to define average parameter values and standard deviations of the measured various parameter values;

the baseline passcode parameters are determined as the average parameter values; and the envelope about the baseline passcode parameters is determined as a multiple of the standard deviations of the measured various parameter values.

41. The electronic device of claim 37, further comprising:

means for receiving a user input to adjust the envelop about the baseline passcode parameters; and means for adjusting the envelope about the baseline passcode parameters based on the received user input before storing the envelope in memory.

42. The electronic device of claim 40, further comprising:

means for receiving a user input to adjust the envelop about the baseline passcode parameters; and means for adjusting the multiple of the standard deviations of the measured parameter values used to calculate the envelope before storing the envelope in memory.

43. A server, comprising:

means for receiving from a client a plurality of graphical passcode datasets to be used by a means for generating a passcode template for authenticating the client, wherein each graphical passcode dataset comprises parameters of time, X-axis position, Y-axis position and one or more of pressure, speed, and contact area, wherein each graphical passcode comprises at least one swipe and at least one tap;

means for analyzing the received plurality of graphical passcode datasets to determine baseline passcode parameters and an envelope about x-axis position and y-axis position baseline passcode parameters that circumscribes at least a portion of the plurality of graphical passcode datasets, means for storing the baseline passcode parameters and the envelope to be used as the passcode template;

means for receiving subsequent graphical passcode data from the client, the subsequent graphical passcode data including measurements of various parameters associated with a subsequent graphical passcode that is received by a touchsurface coupled to the client, the various parameters comprising time, X-axis position, Y-axis position and one or more of pressure, speed, and contact area;

means for expanding the envelope of the graphical passcode upon detection of acceleration consistent with a bumpy environment to make it easier for a user to enter a passcode that complies with authentication criteria;

means for comparing the received subsequent graphical passcode data to the passcode template stored in the means for storing; and means for authenticating the client if the subsequent graphical passcode data substantially matches the passcode template, wherein the subsequent graphical passcode data substantially matches the passcode template when the subsequent graphical passcode parameters fall within the stored envelope.

44. The server of claim 43, wherein the plurality of graphical passcode datasets includes one or more of X-axis position, Y-axis position, pressure, speed, and contact area parameter values measured as a function of time.

45. The server of claim 43, wherein:

means for analyzing the received plurality of graphical passcode datasets comprises means for statistically analyzing the graphical passcode datasets to define average parameter values and standard deviations of the parameter values;

the baseline passcode parameters are determined as the average parameter values; and the envelope about the baseline passcode parameters is determined as a multiple of the standard deviations of the parameter values.

46. The server of claim 43, further comprising:

receiving a user input to adjust the envelop about the baseline passcode parameters; and adjusting the envelope about the baseline passcode parameters based on the received user input before storing the envelope in memory.

47. The method of claim 45, further comprising:

receiving a user input to adjust the envelop about the baseline passcode parameters; and adjusting the multiple of the standard deviations of the measured parameter values used to calculate the envelope before storing the envelope in memory.

48. A non-transitory computer-readable medium having stored thereon processor executable software instructions configured to cause a processor to perform operations comprising:

receiving via a touchsurface a plurality of inputted graphical passcodes from a user to be used in generating a passcode template, wherein each graphical passcode comprises at least one swipe and at least one tap;

for each of the plurality of inputted graphical passcodes:

measuring various parameter values associated with each touchsurface touch of the inputted graphical passcode, the various parameters comprising time, X-axis position, Y-axis position and one or more of pressure, speed, and contact area, and storing the measured parameter values in memory;

analyzing the stored measured parameter values of each of the plurality of inputted graphical passcodes to determine baseline passcode parameters and an envelope about x-axis position and y-axis position baseline passcode parameters that circumscribes at least a portion of the plurality of inputted graphical passcodes, storing in memory the baseline passcode parameters and envelope to be used as the passcode template;

receiving via a touchsurface a subsequently inputted graphical passcode from the user; measuring various parameter values associated with each touchsurface touch of the subsequently inputted graphical passcode, the various parameters comprising time, X-axis position, Y-axis position and one or more of pressure, speed, and contact area;

expanding the envelope of the graphical passcode upon detection of acceleration consistent with a bumpy environment to make it easier for a user to enter a passcode that complies with authentication criteria;

comparing the measured parameter values of the subsequently inputted graphical passcode to the passcode template stored in memory;

and granting access to an asset if the measured parameter values of the subsequently inputted graphical passcode substantially matches the passcode template, wherein the subsequently inputted graphical passcode substantially matches the passcode template when the subsequently inputted graphical passcode parameters fall within the stored envelope.

49. The non-transitory computer-readable medium of claim 48, wherein one or more of X-axis position, Y-axis position, pressure, speed, and contact area parameter values are measured as a function of time.

50. The non-transitory computer-readable medium of claim 48 having stored thereon processor-executable software instructions configured to cause a processor to perform further steps comprising:

transmitting the measured parameter values of the subsequently inputted graphical passcode to a remote processor, wherein the step of comparing the measured parameter values of the subsequently inputted graphical passcode to a passcode template is performed by the remote processor and the passcode template is stored in memory of the remote processor; and receiving a signal from the remote processor indicating whether access to the asset is granted or denied.

51. The non-transitory computer-readable medium of claim 48, wherein:

analyzing the stored measured parameter values of each of the plurality of inputted graphical passcodes comprises statistically analyzing the measured parameter values to define average parameter values and standard deviations of the measured values;

the baseline passcode parameters are determined as the average parameter values; and the envelope about the baseline passcode parameters is determined as a multiple of the standard deviations of the measured values.

52. The non-transitory computer-readable medium of claim 51, wherein the envelope is defined over a time domain.

53. The non-transitory computer-readable medium of claim 51, wherein the envelope is defined over a position domain.

54. The non-transitory computer-readable medium of claim 48, having stored thereon processor-executable software instructions configured to cause a processor to perform steps further comprising:

receiving a user input to adjust the envelop about the baseline passcode parameters; and adjusting the envelope about the baseline passcode parameters based on the received user input before storing the envelope in memory.

55. The non-transitory computer-readable medium of claim 51, having stored thereon processor-executable software instructions configured to cause a processor to perform steps further comprising:

receiving a user input to adjust the envelop about the baseline passcode parameters; and adjusting the multiple of the standard deviations of the measured parameter values used to calculate the envelope before storing the envelope in memory.

56. The non-transitory computer-readable medium of claim 51, wherein the various parameter values are measured as a function of position on the touchsurface.

57. A non-transitory computer-readable medium having stored thereon processor executable software instructions configured to cause a server processor to perform steps comprising:

receiving from a client a plurality of graphical passcode datasets to be used in generating a passcode template for authenticating the client, wherein each graphical passcode dataset comprises parameters of time, X-axis position, Y-axis position and one or more of pressure, speed, and contact area, wherein each graphical passcode comprises at least one swipe and at least one tap;

analyzing the received plurality of graphical passcode datasets to determine baseline passcode parameters and an envelope about x-axis position and y-axis position baseline passcode parameters that circumscribes at least a portion of the plurality of graphical passcode datasets storing in server memory the baseline passcode parameters and envelope to be used as the passcode template;

receiving subsequent graphical passcode data from the client, the subsequent graphical passcode data including measurements of various parameters associated with the graphical passcode that is received by a touchsurface coupled to the client, the various parameters comprising time, X-axis position, Y-axis position and one or more of pressure, speed, and contact area;

expanding the envelope of the graphical passcode upon detection of acceleration consistent with a bumpy environment to make it easier for a user to enter a passcode that complies with authentication criteria;

comparing the received subsequent graphical passcode data to the passcode template stored in memory of the server; and authenticating the client if the subsequent graphical passcode data substantially matches the passcode template, wherein the subsequent graphical passcode data substantially matches the passcode template when the subsequent graphical passcode parameters fall within the stored envelope.

58. The non-transitory computer-readable medium of claim 57, wherein the plurality of graphical passcode datasets includes one or more of X-axis position, Y-axis position, pressure, speed, and contact area parameter values measured as a function of time.

59. The non-transitory computer-readable medium of claim 57, wherein:

analyzing the received plurality of graphical passcode datasets comprises statistically analyzing the graphical passcode datasets to define average parameter values and standard deviations of the parameter values;

the baseline passcode parameters are determined as the average parameter values; and the envelope about the baseline passcode parameters is determined as a multiple of the standard deviations of the parameter values.

60. The non-transitory computer-readable medium of claim 59, wherein the envelope is defined over a time domain.

61. The non-transitory computer-readable medium of claim 59, wherein the envelope is defined over a position domain.

62. The non-transitory computer-readable medium of claim 57, having stored thereon processor-executable software instructions configured to cause a processor to perform steps further comprising:

receiving a user input to adjust the envelop about the baseline passcode parameters; and adjusting the envelope about the baseline passcode parameters based on the received user input before storing the envelope in memory.

63. The non-transitory computer-readable medium of claim 59, having stored thereon processor-executable software instructions configured to cause a processor to perform steps further comprising:
receiving a user input to adjust the envelop about the baseline passcode parameters; and
adjusting the multiple of the standard deviations of the measured parameter values used to calculate the envelope before storing the envelope in memory.

* * * * *